(12) United States Patent
Abdelghaffar et al.

(10) Patent No.: US 12,284,639 B2
(45) Date of Patent: Apr. 22, 2025

(54) BANDWIDTH OPERATION FOR FULL DUPLEX USER EQUIPMENT

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Yeliz Tokgoz, San Diego, CA (US); Wanshi Chen, San Diego, CA (US); Huilin Xu, San Diego, CA (US); Ahmed Attia Abotabl, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/786,900

(22) PCT Filed: Dec. 18, 2020

(86) PCT No.: PCT/US2020/066072
§ 371 (c)(1),
(2) Date: Jun. 17, 2022

(87) PCT Pub. No.: WO2021/133678
PCT Pub. Date: Jul. 1, 2021

(65) Prior Publication Data
US 2023/0353319 A1    Nov. 2, 2023

(30) Foreign Application Priority Data

Dec. 24, 2019 (GR) .............................. 20190100576

(51) Int. Cl.
*H04W 72/0453*    (2023.01)
*H04L 5/00*    (2006.01)
(Continued)

(52) U.S. Cl.
CPC ....... *H04W 72/0453* (2013.01); *H04L 5/0094* (2013.01); *H04W 72/0446* (2013.01); *H04W 72/23* (2023.01)

(58) Field of Classification Search
CPC ......... H04W 72/0453; H04W 72/0446; H04W 72/23–232; H04L 5/0094
See application file for complete search history.

(56) References Cited

U.S. PATENT DOCUMENTS

2018/0183551 A1*  6/2018  Chou ................. H04W 74/006
2018/0270816 A1*  9/2018  Li ....................... H04B 7/2656
(Continued)

FOREIGN PATENT DOCUMENTS

WO    2018128855 A1    7/2018

OTHER PUBLICATIONS

International Search Report and Written Opinion—PCT/US2020/066072—ISA/EPO—Mar. 30, 2021.

*Primary Examiner* — Kevin C. Harper
(74) *Attorney, Agent, or Firm* — Patterson+ Sheridan, L.L.P.

(57) ABSTRACT

Techniques and apparatus for adapting bandwidth operation for full duplex user equipments (UEs) are described. One technique involves a base station (BS) determining a plurality of resource bandwidths (BWs) within an active BWP that are available to be used for communications by one or more UEs. An indication of at least one resource BW of the plurality of resource BWs is signaled to a UE. Communications between the BS and the UE are performed on the at least one resource BW.

31 Claims, 18 Drawing Sheets

(51) Int. Cl.
  *H04W 72/0446*  (2023.01)
  *H04W 72/23*  (2023.01)

(56) References Cited

U.S. PATENT DOCUMENTS

| | | | |
|---|---|---|---|
| 2018/0279326 A1* | 9/2018 | Park | H04L 5/0096 |
| 2019/0090299 A1 | 3/2019 | Ang et al. | |
| 2019/0149380 A1 | 5/2019 | Babaei et al. | |
| 2019/0182899 A1 | 6/2019 | Ye et al. | |
| 2019/0260447 A1 | 8/2019 | Nam et al. | |
| 2019/0306861 A1* | 10/2019 | Li | H04L 5/0044 |
| 2019/0313412 A1 | 10/2019 | Baldemair et al. | |
| 2019/0319833 A1 | 10/2019 | Nagaraja et al. | |
| 2020/0305146 A1* | 9/2020 | Matsumura | H04L 5/0012 |
| 2022/0173784 A1* | 6/2022 | Gao | H04B 7/0874 |

* cited by examiner

| μ | NR Slot Length (ms) | BWP Switch Delay $T_{BWPswitchDelay}$ (slots) ||
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |
| Note 1: | Depends on UE capability. ||||
| Note 2: | If the BWP switch involves changing of SCS, the BWP switch delay is determined by the larger one between the SCS before BWP switch and the SCS after BWP switch. ||||

BANDWIDTH OPERATION FOR FULL DUPLEX USER EQUIPMENT

CROSS-REFERENCE TO RELATED APPLICATIONS

This application is a national stage application under 35 U.S.C. 371 of PCT/CN2020/066072, filed Dec. 18, 2020, which claims benefit of and priority to Greek application No. 20190100576, filed Dec. 24, 2019, which are hereby expressly incorporated by reference herein in their entirety as if fully set forth below and for all applicable purposes.

BACKGROUND

I. Field of the Disclosure

Aspects of the present disclosure relate to wireless communications, and more particularly, to techniques for user equipment(s) to adapt an operating bandwidth with reduced (or even zero) latency.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication that may be performed by a UE. The method generally includes receiving, from a network entity, an indication of a first resource bandwidth (BW) of a plurality of resource BWs within an active bandwidth part (BWP) to use for communications. The method also includes performing communications with the network entity on the first resource BW.

Certain aspects provide an apparatus for wireless communication. The apparatus generally includes a receiver, at least one processor, and a memory coupled to the at least one processor. The receiver is configured to receive, from a network entity, an indication of a first resource bandwidth (BW) of a plurality of resource BWs within an active bandwidth part (BWP) to use for communications. The at least one processor is configured to perform communications with the network entity on the first resource BW.

Certain aspects provide an apparatus for wireless communication. The apparatus generally includes means for receiving, from a network entity, an indication of a first resource bandwidth (BW) of a plurality of resource BWs within an active bandwidth part (BWP) to use for communications. The apparatus also includes means for performing communications with the network entity on the first resource BW.

Certain aspects provide a computer readable medium having computer executable code stored thereon for wireless communications by a UE. The computer executable code generally includes code for receiving, from a network entity, an indication of a first resource bandwidth (BW) of a plurality of resource BWs within an active bandwidth part (BWP) to use for communications. The computer executable code also includes code for performing communications with the network entity on the first resource BW.

Certain aspects provide a method for wireless communication that may be performed by network entity, such as a BS, gNB, etc. The method generally includes determining a plurality of resource bandwidths (BWs) within an active BWP that are available to be used for communications by one or more UEs. The method also includes signaling an indication of a first resource BW to a first UE of the one or more UEs. The method further includes performing communications with the first UE on the first resource BW.

Certain aspects provide an apparatus for wireless communication. The apparatus generally includes at least one processor, a memory coupled to the at least one processor, and a transmitter. The at least one processor is configured to determine a plurality of resource bandwidths (BWs) within an active BWP that are available to be used for communications by one or more UEs. The transmitter is configured to transmit an indication of a first resource BW to a first UE of the one or more UEs. The at least one processor is also configured to perform communications with the first UE on the first resource BW.

Certain aspects provide an apparatus for wireless communication. The apparatus generally includes means for determining a plurality of resource bandwidths (BWs) within an active BWP that are available to be used for communications by one or more UEs. The apparatus also includes means for signaling an indication of a first resource BW to a first UE of the one or more UEs. The apparatus further includes means for performing communications with the first UE on the first resource BW.

Certain aspects provide a computer readable medium having computer executable code stored thereon for wireless communications by a network entity. The computer executable code generally includes code for determining a plurality of resource bandwidths (BWs) within an active BWP that are available to be used for communications by one or more UEs. The computer executable code also includes means for signaling an indication of a first resource BW to a first UE of the one or more UEs. The computer executable code further includes code for performing communications with the first UE on the first resource BW.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
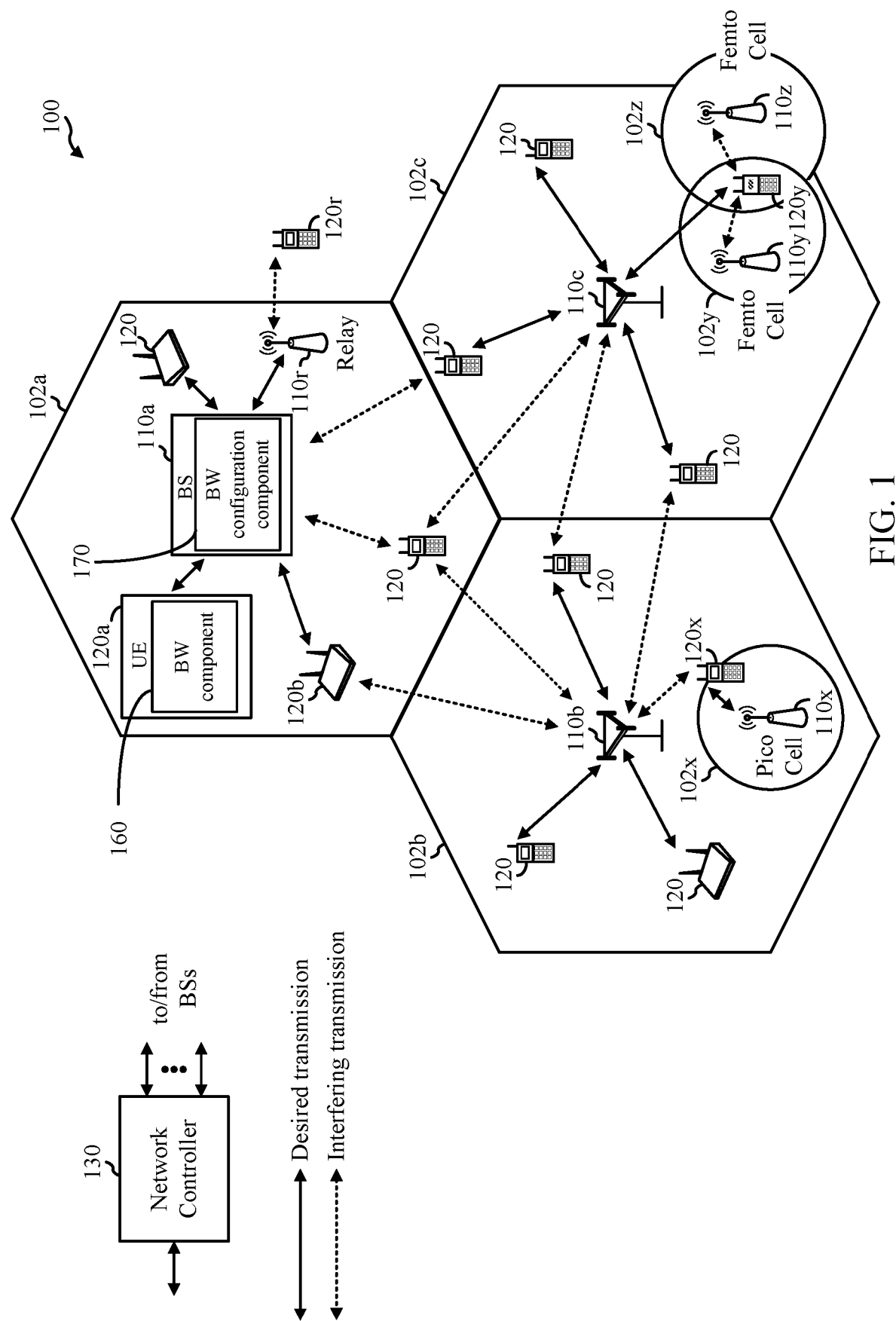
FIG. 1 is a block diagram conceptually illustrating an example telecommunications system, in accordance with certain aspects of the present disclosure.

In many communication systems, a switching delay is generally imposed when the UE adapts or changes the operating bandwidth (BW). In certain situations, however, this switching delay can cause lower spectrum efficiency. For example, for a full duplex (FD) communication system, the network may have to change the BW (including the uplink (UL)/downlink (DL) allocations) from slot to slot (or even within a slot) without incurring such a switching delay.

To address this, aspects of the present disclosure provide apparatus, methods, processing systems, and computer readable mediums that enable a UE operating with FD capability to adapt its operating BW with reduced (or zero) latency, compared to conventional techniques in which there is a switching delay for the UE to adapt the operating BW. As described in more detail below, in certain aspects, one or more resource BWs within an active BW, such as an active bandwidth part (BWP), can be configured for the UE. Each resource BW within the active BWP may have a different configuration of time and/or frequency resources. The resource BW can be considered a sub-BWP configuration, which can have a contiguous or non-contiguous frequency resources within the active BWP. By defining multiple resource BWs within an active BWP in this manner, aspects can enable the UE to switch to different resource BWs without incurring (or least incurring a reduced) switching delay.

The following description provides example techniques for adapting an operating BW, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be a full-duplex NR system (e.g., a full-duplex 5G network). As shown in FIG. 1, the UE 120a has a BW component 160 that may be configured for adapting an operating BW of the UE 120a without incurring a switching delay, according to aspects described herein. For example, using the BW component 160, the UE 120a may receive, from a network entity (e.g., gNB, such as BS 110a), an indication of at least one resource BW within an active BWP to use for communications. Using the BW component 160, the UE 120a may perform communications with the network entity on the at least one resource BW.

Similarly, as shown in FIG. 1, the BS 110a has a BW configuration component 170 that may configure a UE, such as UE 120a, to adapt an operating BW without incurring a switching delay, according to aspects described herein. For example, using the BW configuration component 170, the BS 110a may determine multiple resource BWs within an active BWP that are available to be used for communications by UE(s) (e.g., UE 120a). Using the BW configuration component 170, the BS 110a may signal an indication of at least one of the resource BWs to at least one UE (e.g., UE 120a) and may perform communications with the at least one UE on the at least one resource BW.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120a, 120b, 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing (SCS). The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
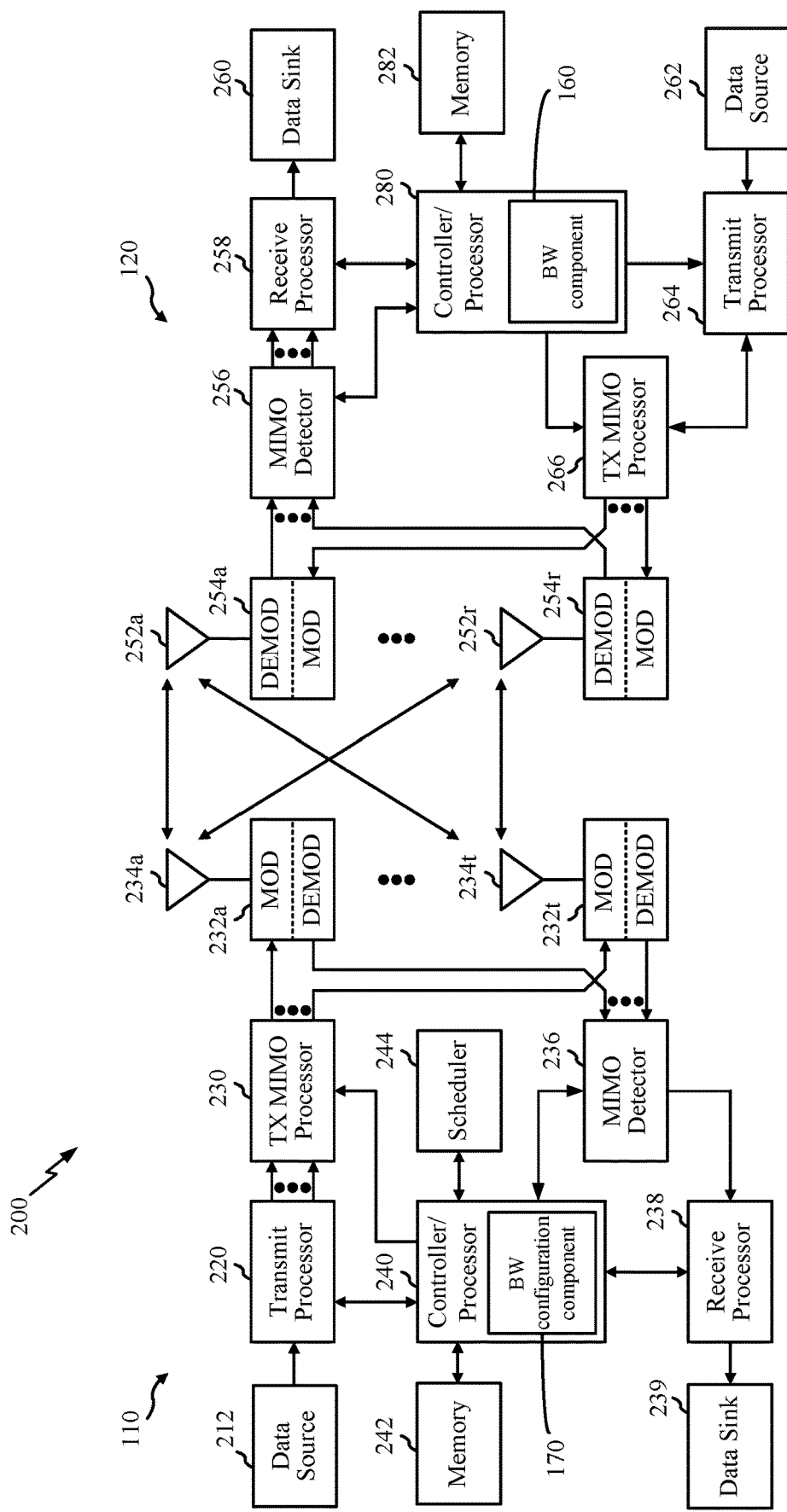
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a BW configuration component 170 that may configure a UE, such as UE 120a, to adapt an operating BW without incurring a switching delay, according to aspects described herein. As also shown in FIG. 2, the controller/processor 280 of the UE 120 has a BW component 160 that may be configured for adapting an operating BW of the UE 120a without incurring a switching delay, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct operations 1600 in FIG. 16 and/or the execution of other processes for the techniques described herein. The controller/processor 280 and/or other processors and modules at the UE 120 may perform or direct operations 1500 in FIG. 15 and/or the execution of other processes for the techniques described herein. The memories 242 and 282 may store data and program codes for BS 110 and UE 120, respectively. A scheduler 244 may schedule UEs for data transmission on the downlink and/or uplink.

Figure 3:
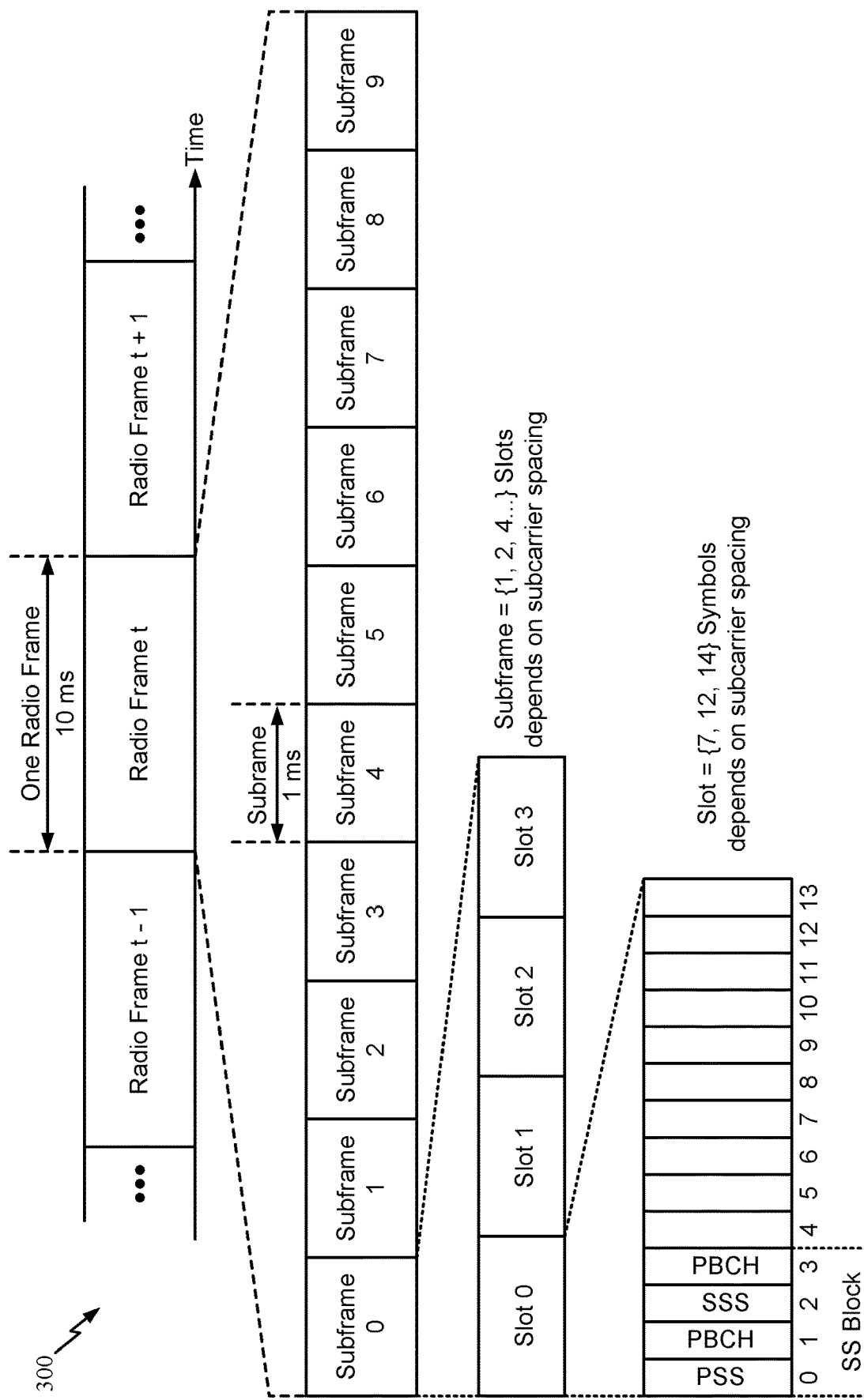
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Fifth generation (5G) wireless networks are expected to provide ultra-high data rates and support a wide scope of application scenarios. Wireless full-duplex (FD) communications is an emerging technique and is theoretically capable of doubling the link capacity when compared with half-duplex communications. The main idea of wireless full-duplex communications is to enable radio network nodes to transmit and receive simultaneously on the same frequency band in the same time slot. This contrasts with conventional half-duplex operation, where transmission and reception either differ in time or in frequency.

Figure 4A:
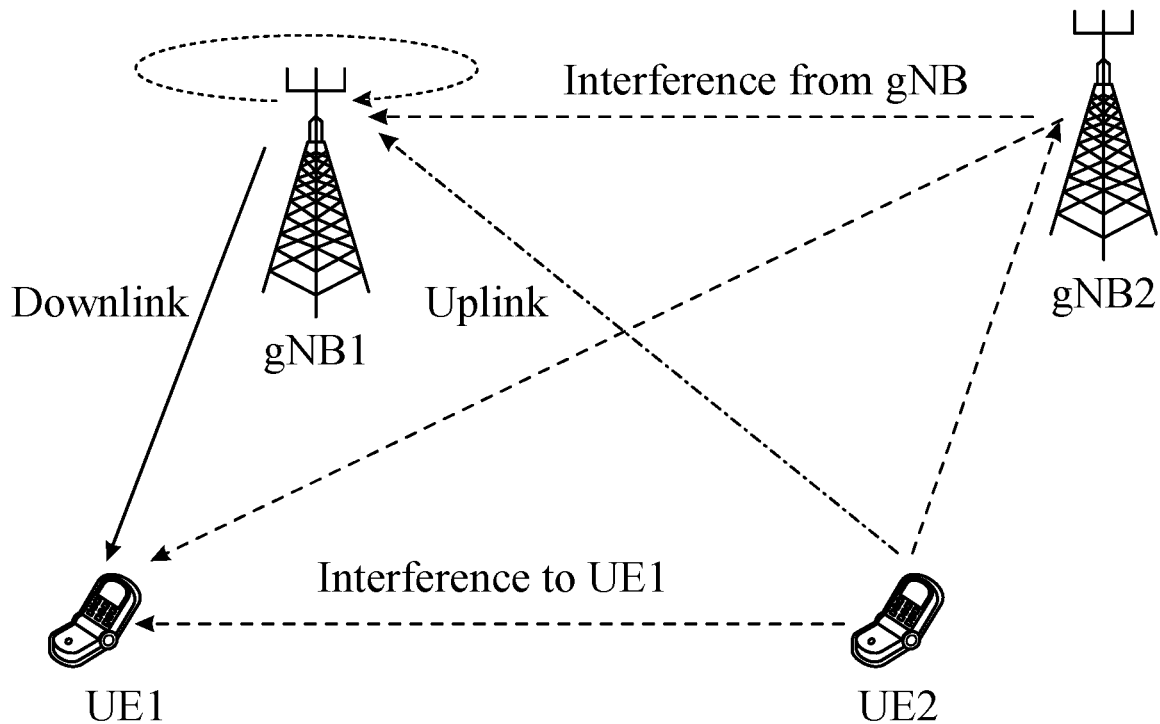
FIGS. 4A-4C illustrate different full duplex communication modes, in accordance with certain aspects of the present disclosure.

According to certain aspects, the wireless communication system may support various FD communication modes. FIG. 4A, for example, illustrates a FD communication mode with a FD BS (e.g., gNB1) and HD UE (e.g., UE). In FIG. 4A, the FD BS can communicate simultaneously in UL and DL with two half-duplex terminals (i.e., UE1 and UE2) using the same radio resources. Here, the FD BS may be susceptible to self-interference from its downlink to uplink operation and interference from other gNBs (e.g., gNB2). Similarly, the HD UE (e.g., UE1) may be susceptible to interference from the other gNB(s) (e.g., gNB2) and interference from other UEs (e.g., UE2).

Figure 4B:
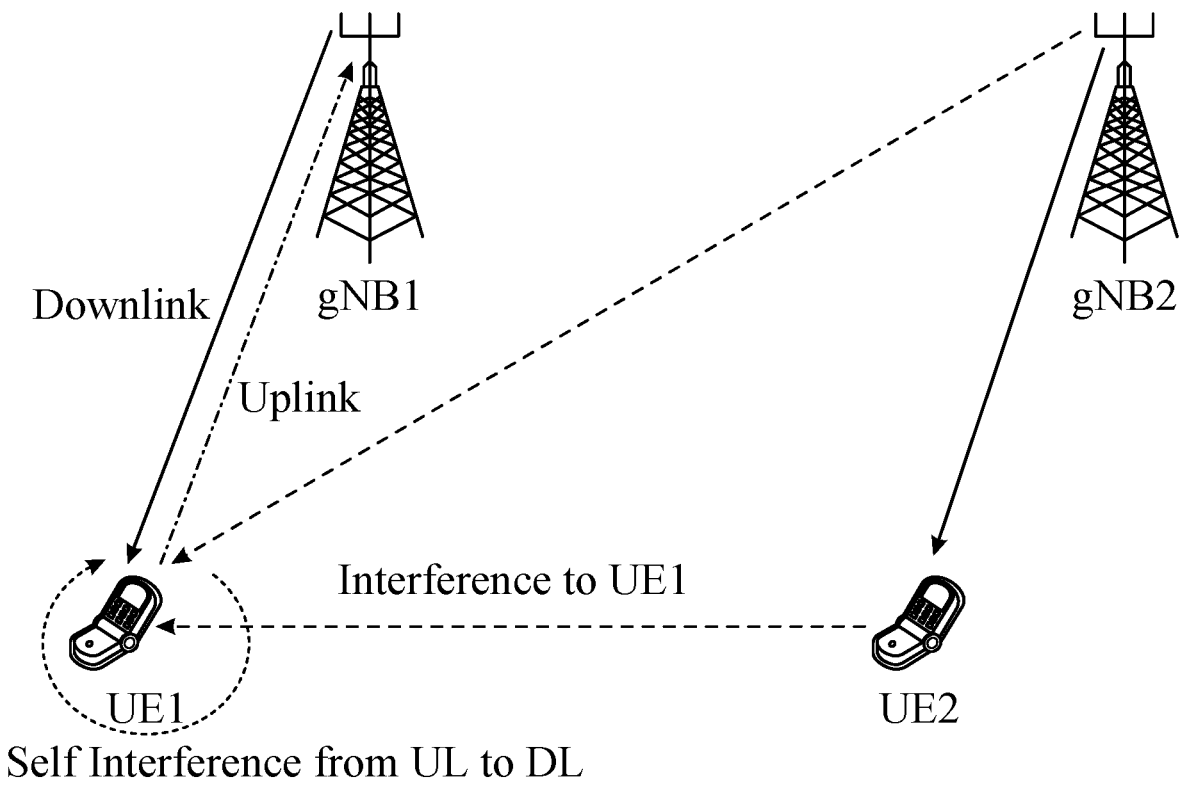

FIG. 4B illustrates another FD communication mode with a FD gNB (e.g., gNB1) and a FD UE (e.g., UE1). In FIG. 4B, the FD gNB and FD UE can communicate simultaneously in UL and DL with each other using the same radio resources. While communicating, the FD UE may be susceptible to self-interference, interference from other gNB(s) (e.g., gNB2), and interference from UE2.

Figure 4C:
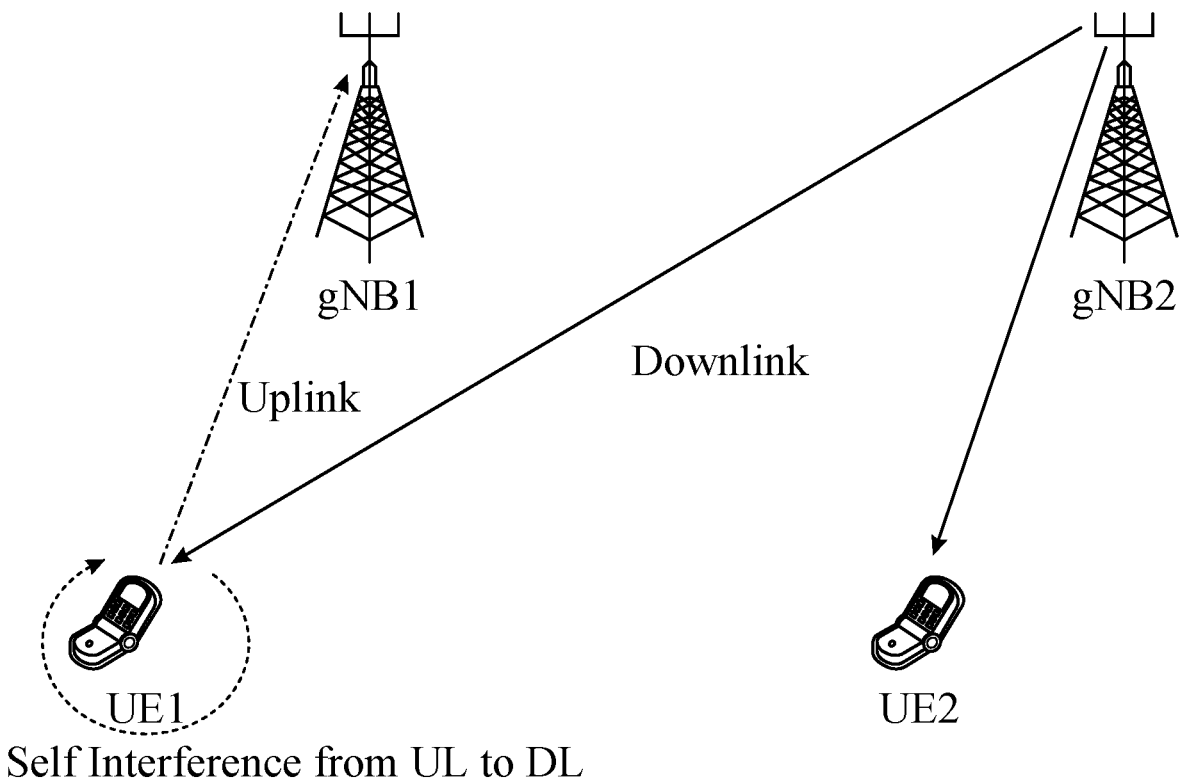

FIG. 4C illustrates yet another FD communication mode with a FD UE only (e.g., UE1). Here, the FD UE can communicate simultaneously in UL and DL with multiple transmission-reception points (e.g., multiple BSs, such as gNB1 and gNB2) using the same radio resources. In this example, the FD UE may be susceptible to self-interference from UL to DL operation.

Figure 5A:
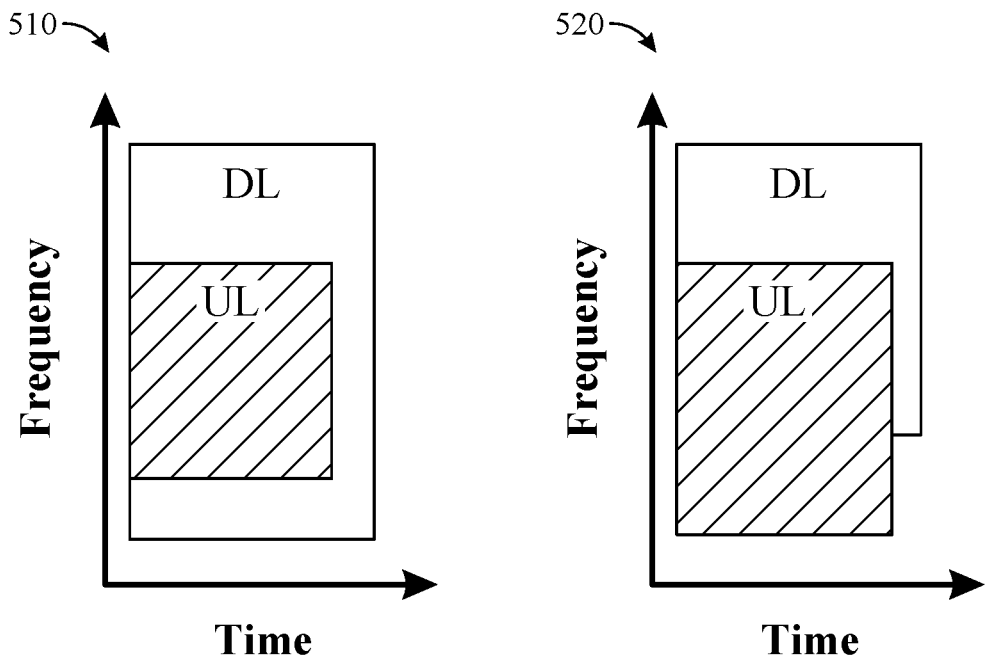
FIGS. 5A & 5B show examples of different types of full duplex operation, in accordance with certain aspects of the present disclosure.

In addition to supporting various FD communication modes (also referred to herein as deployments), the wireless communication system may support various types of FD operation. In-band full duplex (IBFD) depicted in FIG. 5A, for example, is one type of FD operation in which devices can transmit and receive at the same time and on the same frequency resources. As shown in 510 of FIG. 5A, in one aspect, the DL and UL may fully share the same IBFD time/frequency resource (e.g., there may be a full overlap of the DL and UL allocations within the IBFD time/frequency resource). As shown in 520 of FIG. 5A, in one aspect, the DL and UL may partially share the same IBFD time/frequency resource (e.g., there may be a partial overlap of the DL and UL allocations within the IBFD time/frequency resource).

Figure 5B:
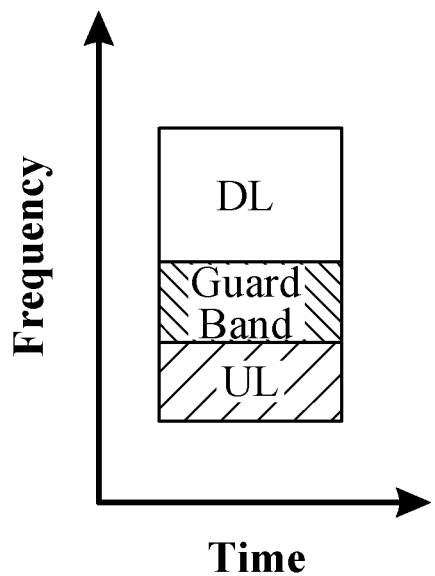

Sub-band full duplex (SBFD) (also referred to as flexible duplex), which is shown in FIG. 5B, is another type of FD operation in which devices can transmit and receive at the same time but on different frequency resources. As shown in FIG. 5B, the DL resource may be separated from the UL resource in the frequency domain by a guard band. This mode of operations reduces the self-interference cancellation requirements on the FD device since the leakage is lower.

Figure 6:
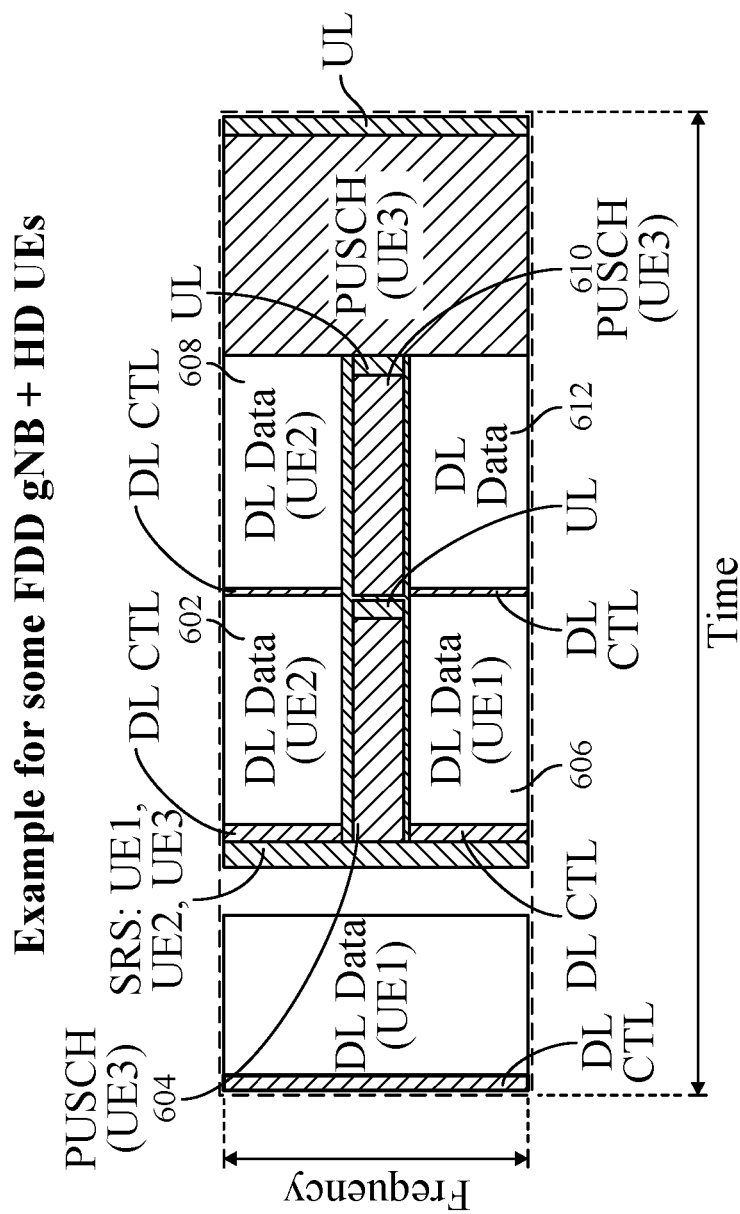
FIG. 6 illustrates an example spectrum for a full duplex base station and half duplex UE, in accordance with certain aspects of the present disclosure.
Figure 6:
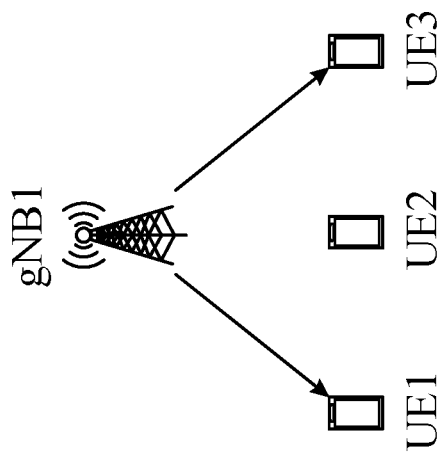

In some aspects, there may be flexible DL/UL operation in time (across and within slots) and across UEs. FIG. 6 illustrates an example use of time/frequency resources for a FD gNB (e.g., gNB1) and HD UEs (e.g., UE1, UE2, and UE3). As shown, there may be simultaneous PDSCH and PUSCH grants for the same subframe/slot (for different UEs). For example, there is a PDSCH grant 602 for UE2, a PUSCH grant 604 for UE3, and a PDSCH grant 606 for UE1 that occur during the same subframe/slot. Additionally, there is a PDSCH grant 608 for UE2, a PUSCH grant 610 for UE3, and a PDSCH grant 612 for UE1 that occur during the same subframe/slot.

Figure 7:
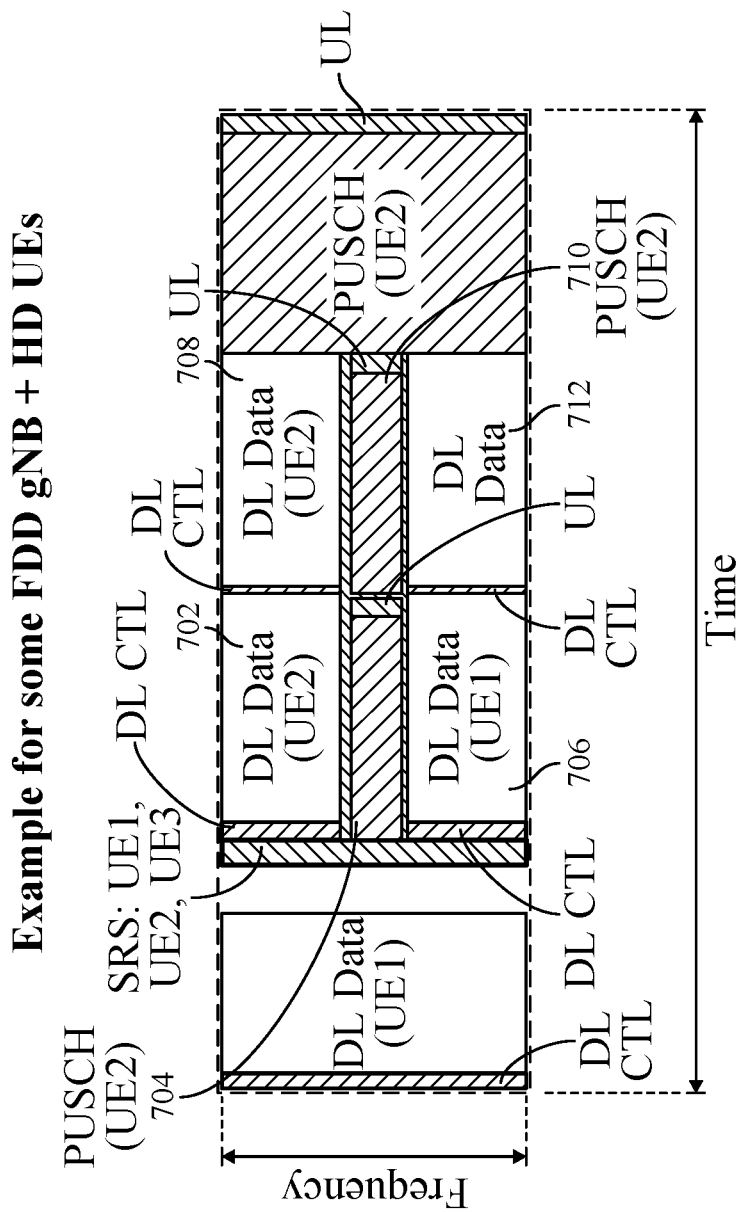
FIG. 7 illustrates an example spectrum for a full duplex base station and a full duplex UE, in accordance with certain aspects of the present disclosure.
Figure 7:
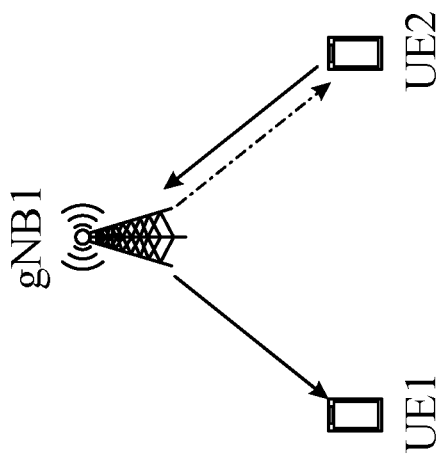

FIG. 7 illustrates another example use of time/frequency resources (e.g., an example spectrum) for a FD gNB (e.g., gNB1) and FD UEs (e.g., UE2). As shown, compared to FIG. 6, there may be simultaneous PDSCH and PUSCH grants for the same subframe/slot for the same UE (e.g., UE2) and/or different UEs. For example, for a FD UE (e.g., UE2) there may be a simultaneous UL and DL grant. Here, in particular, there is (i) a PDSCH grant 702 and a PDSCH grant 704 for the same UE2 and (ii) a PDSCH grant 706 for UE1 in the same subframe/slot. Additionally, there is (i) a PDSCH grant 708 and a PDSCH grant 710 for the same UE2 and (ii) a PDSCH grant 712 for UE1 in the same subframe/slot.

In current communication systems, a switching delay is typically imposed when the UE adapts or changes the operating BWP. However, for a FD wireless system, the network may have to change the BW (and in addition the UL/DL allocations) from a slot to slot or even within the slot without incurring such a delay. In FIGS. 6 and 7, for example, the UE(s) may have to change the UL transmission (or DL reception) BWP between slots in zero latency.

Figures 8, 9:
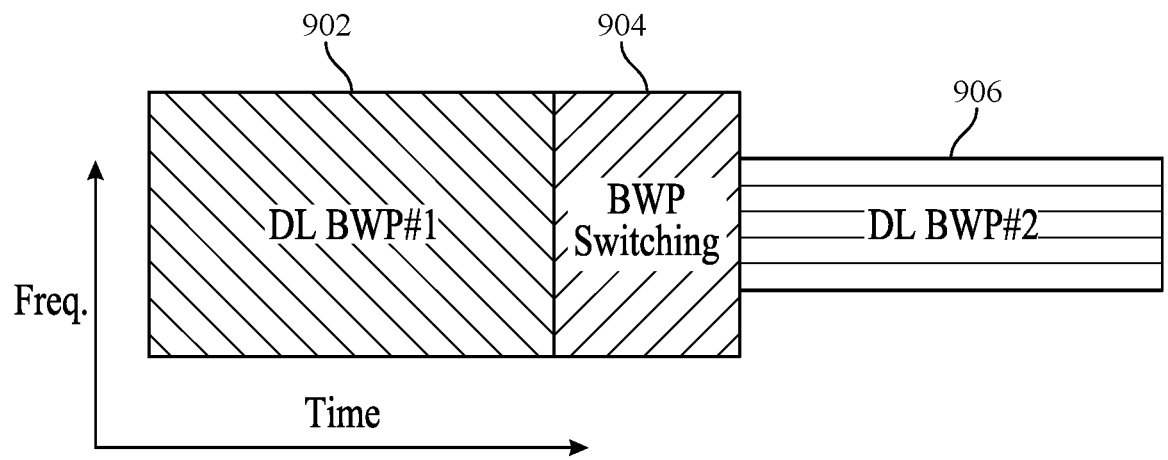
FIG. 8 illustrate an example of bandwidth part switching delays, in accordance with certain aspects of the present disclosure.
FIG. 9 illustrates an example scenario in which a BWP switching delay is implemented, in accordance with certain aspects of the present disclosure.

In general, the switching delay associated with adaptation of the BWP may be defined by the number of slots (e.g., # slots). FIG. 8 illustrates an example of BWP switch delays for different slot lengths. As shown in FIG. 9, this BWP switching delay 904 may be imposed when switching from a first BWP 902 (e.g., DL BWP #1) to a second BWP 906 (e.g., DL BWP #2). This switching delay, however, can cause lower spectrum efficiency. Accordingly, it may be desirable to provide techniques that enable FD devices (e.g., FD UEs, FD BSs, etc.) to change the operating BW in a flexible manner within minimum (or even zero) latency.

Example Bandwidth Operation for Full Duplex User Equipment

Aspects of the present disclosure provide techniques that enable FD devices (e.g., FD UEs) to adapt an operating bandwidth with reduced (or zero) latency. More specifically, aspects provide techniques for defining (or allocating) one or more resource BWs within an active BWP. Each resource BW may have a different configuration (e.g., a different portion of the time/frequency resources of the active BWP). By defining multiple resource BWs within an active BWP in this manner, the UE can switch to different resource BWs without incurring a switching delay. That is, the UE can adapt its operating BW with reduced (or zero) latency.

Note that the techniques described herein for defining resource BW(s) within an active BWP may be distinct from defining a wide BWP and changing the DL allocation within the wide BWP. In the latter method, for example, there can be a waste of allocation since the DL may have to be resource block group (RBG) aligned. Likewise, with the latter method, the allocation may not be able to be changed within the slot for one PDSCH (e.g., NR generally allows configuring multiple PDSCHs within the slots, each having different frequency domain resource allocation (FDRA). As used herein, a resource BW may also be referred to as a sub-BWP or other terminology.

Figure 10:
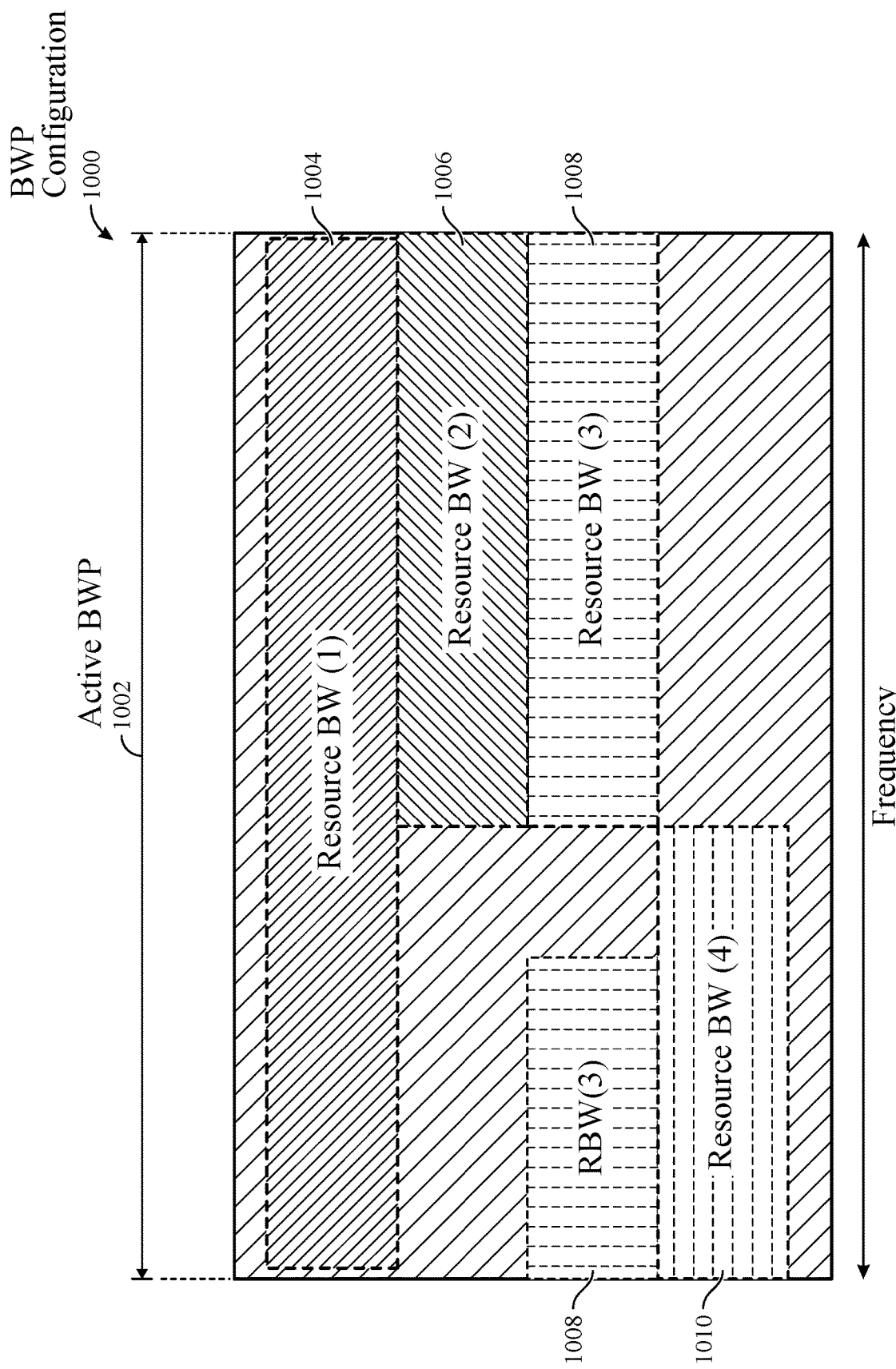
FIG. 10 illustrates an example BWP configuration with multiple resource BWs, in accordance with certain aspects of the present disclosure.

In some aspects, the BS may define or configure one or more different resource BWs within the active BWP and dynamically indicate which resource BW to use. FIG. 10 illustrates one example BWP configuration 1000 with four resource BWs (resource BW1 1004, resource BW2 1006, resource BW3 1008, and resource BW4 1010) defined within the active BWP 1002, according to certain aspects of the present disclosure.

Each resource BW 1004, 1006, 1008, and 1010 may be configured for uplink or downlink. In some aspects, the UL resource BW (e.g., a resource BW configured for uplink) may have a different configuration (e.g., frequency configuration) than a DL resource BW (e.g., a resource BW configured for downlink). Each resource BW 1004, 1006, 1008, and 1010 may have an optimized configuration for that resource BW (e.g., RBG). In some aspects, UL and/or DL resource BWs can be non-overlapping (e.g., SBFD shown in FIG. 5B), partially overlapping (e.g., IBFD depicted in 520 of FIG. 5A), or fully overlapping (e.g., IBFD depicted in 510 of FIG. 5A). The resource BWs can be contiguous (e.g., resource BW1 1004, resource BW2 1006, and resource BW4 1010 have a contiguous set of frequency resources) or disjoint (e.g., resource BW3 has a disjoint set of frequency resources). In some cases, the FDRA per resource BW can be determined with a less number of bits compared to the BWP.

In some aspects, the resource BWs (e.g., resource BWs 1004, 1006, 1008, and 1010) within an active BWP (e.g., active BWP 1002) may be radio resource control (RRC) configured (e.g., configured via RRC signaling). In some aspects, the indication of the particular resource BW to use may be dynamically indicated via downlink control information (DCI) signaling.

Figure 11A:
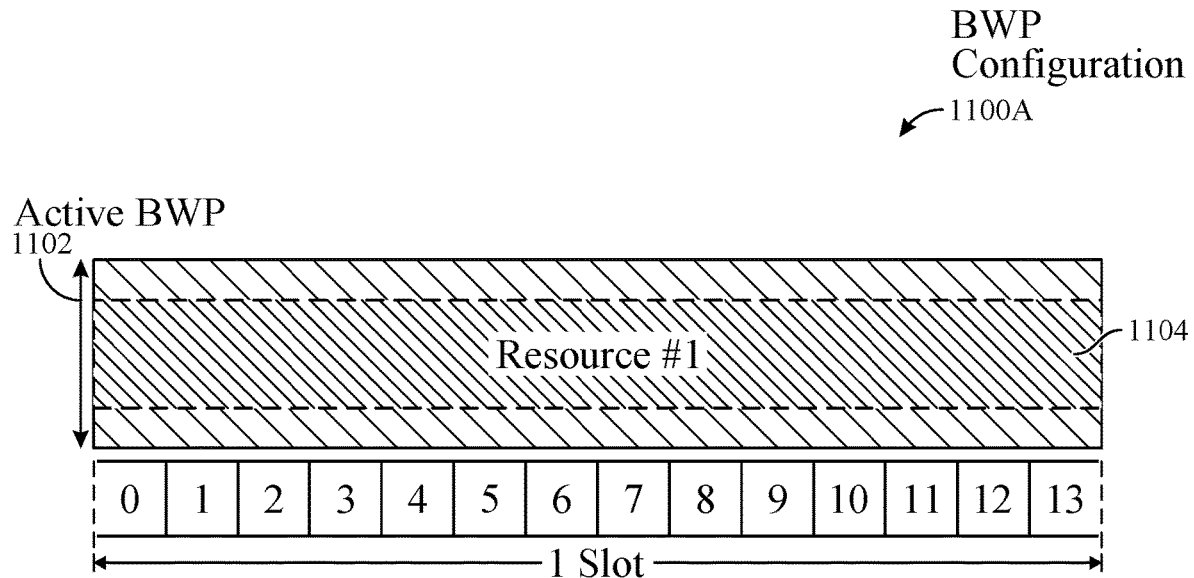
FIGS. 11A-11B illustrate examples of defining a resource BW within an active BWP, in accordance with certain aspects of the present disclosure.

In one aspect, the DCI indication can be slot-based. That is, the DCI indication may indicate that all symbols within the slot have the particular resource BW. FIG. 11A illustrates an example BWP configuration 1100A with a resource BW 1104 defined within the active BWP 1102, according to certain aspects of the present disclosure. Here, the DCI indication indicates that all symbols 0-13 within the slot have the resource BW 1104.

Figure 11B:
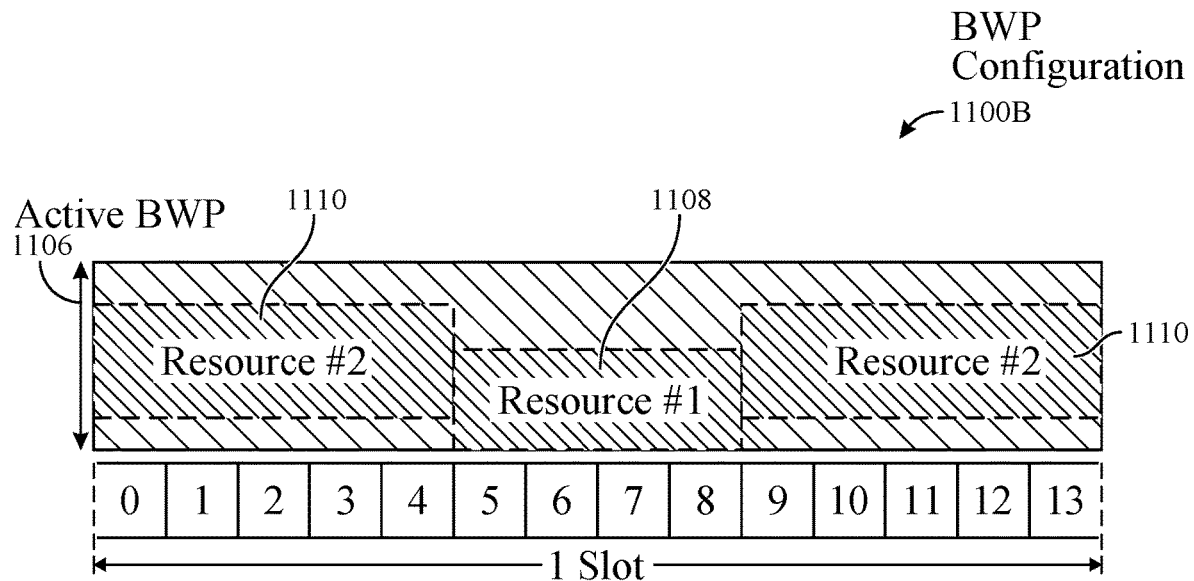

In one aspect, the DCI indication may indicate one or more symbols (within the slot) have the particular resource BW. In one example, the DCI indication may indicate that every N consecutive symbols of one or more slots are configured with a resource BW. FIG. 11B illustrates an example BWP configuration 1100B with resource BW 1108 (e.g., Resource #1) and resource BW 1110 (e.g., Resource #2) defined within the active BWP 1106, according to certain aspects of the present disclosure. Here, the DCI indication can indicate that symbols 0-4 and symbols 9-13 have the resource BW 1110 (e.g., N=5 for resource BW 1110) and symbols 5-8 have the resource BW 1108 (e.g., N=4 for resource BW 1108). The size of the bundle (e.g., N) can be, for example, 1, 2, 4, 6, 7, 8, 14, etc. symbols. In one aspect, the DCI indication may indicate a time domain resource assignment (TDRA) per resource BW. For example, the DCI indication may indicate the start symbol and length (e.g., number of consecutive symbols) for each resource BW.

Figure 12:
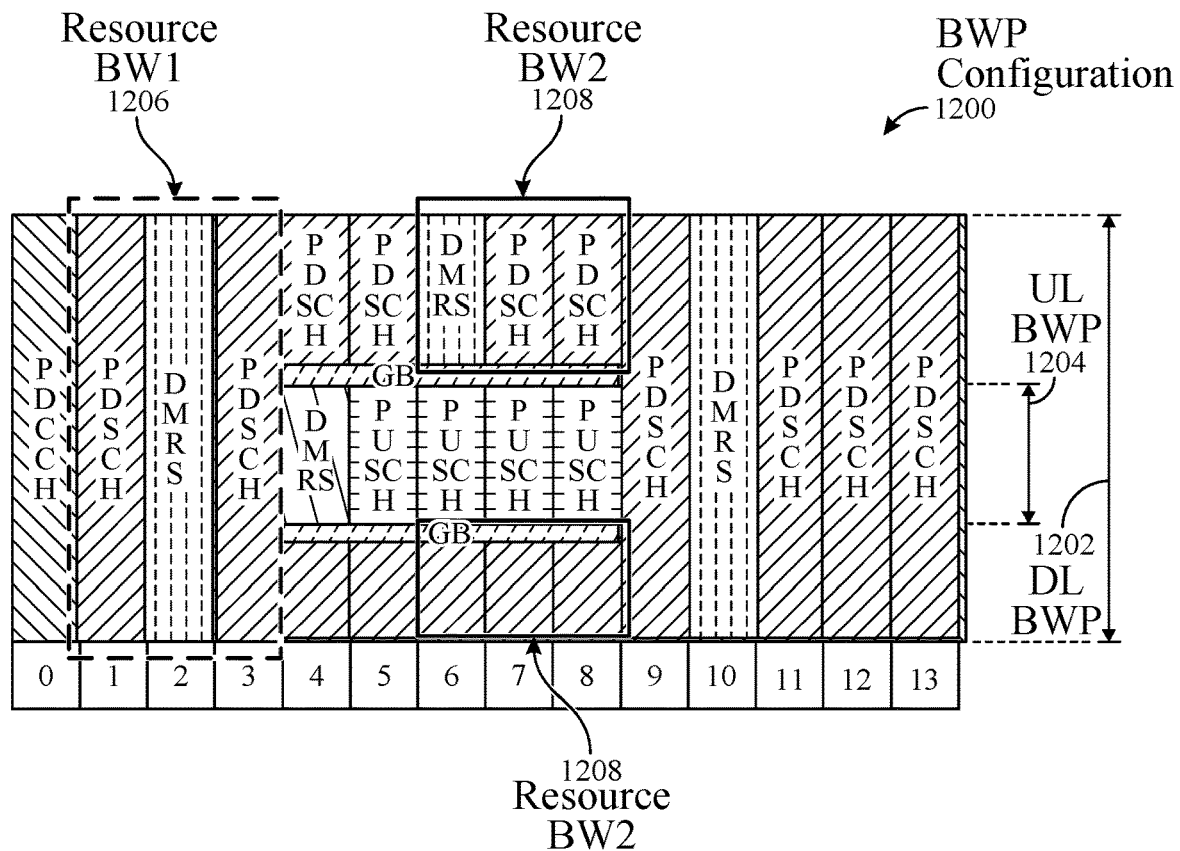
FIGS. 12-14 illustrate different examples of simultaneous UL/DL operation in resource BW(s) of an active BWP, in accordance with certain aspects of the present disclosure.

Aspects also provide techniques that allow for a wideband HD operation and a narrower band for FD operation. To do so, the network may have to configure simultaneous UL/DL in resource BW(s) within the active BWP. In one aspect, to allow for simultaneous UL/DL, the network entity may employ PDSCH rate matching and demodulation reference signal (DMRS) puncturing. FIG. 12 illustrates an example BW configuration 1200 where PDSCH rate matching and/or DMRS puncturing can be used to allow for simultaneous UL/DL in resource BW(s), according to certain aspects of the present disclosure. Here, the BW configuration 1200 includes a DL BWP 1202 and a UL BWP 1204. The resource BW1 1206 is defined within the DL BWP 1202 and can be used for wideband HD operation. The resource BW2 1208 is also defined within the DL BWP 1202 and can be used for FD operation. To enable simultaneous UL/DL operation between the resource BWs within the active BWP (e.g., DL BWP 1202), the PDSCHs in symbols 4-5 and 7-8 can be rate-matched and the DMRS in symbol 6 can be punctured, e.g., since they collide with the UL and guard band as shown. This process may be similar to SSB operation within the active DL BWP.

Figure 13:
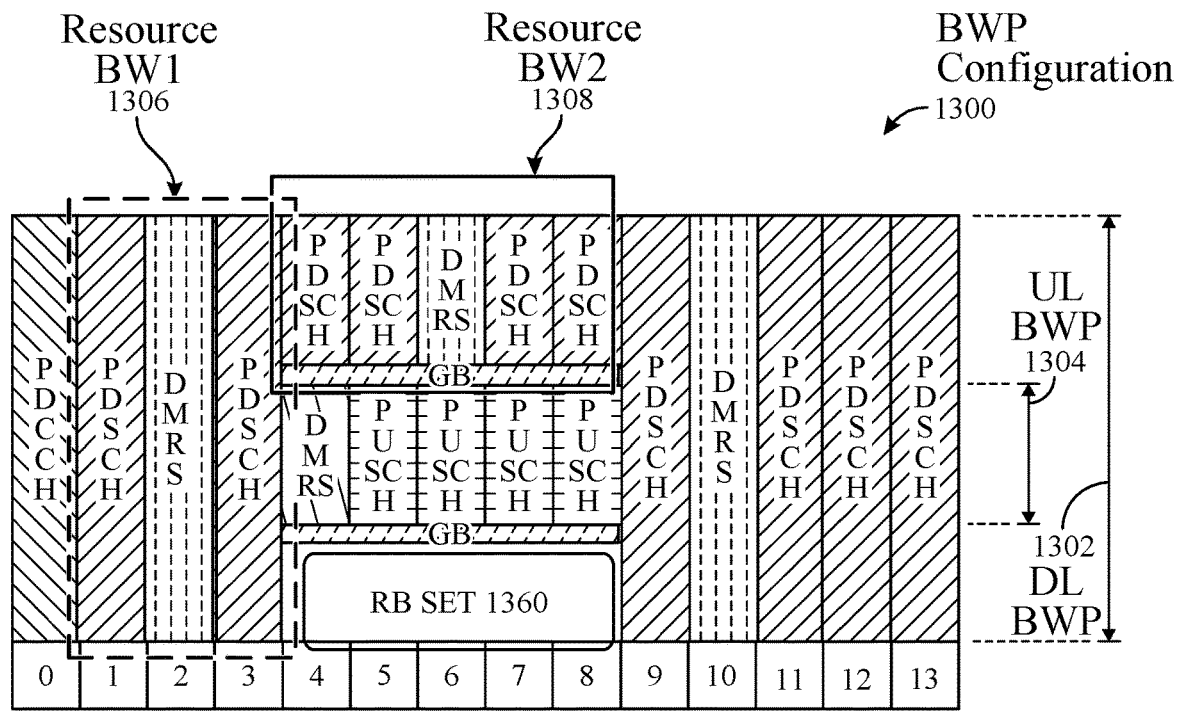

In some aspects, the RBs that collide with the same UE UL, other UE(s) UL, and guard band may be punctured to allow for simultaneous UL/DL between resource BWs of an active BWP. FIG. 13, for example, illustrates an example BW configuration 1300 with a DL BWP 1302 and UL BWP 1304 (e.g., similar to DL BWP 1202 and UL BWP 1204 in FIG. 12), according to certain aspects of the present disclosure. In this example, the colliding resources (e.g., set of RB(s) 1360) may be punctured due to, e.g., colliding with the same UE UL, other UE(s) UL, and/or guard band.

Figure 14:
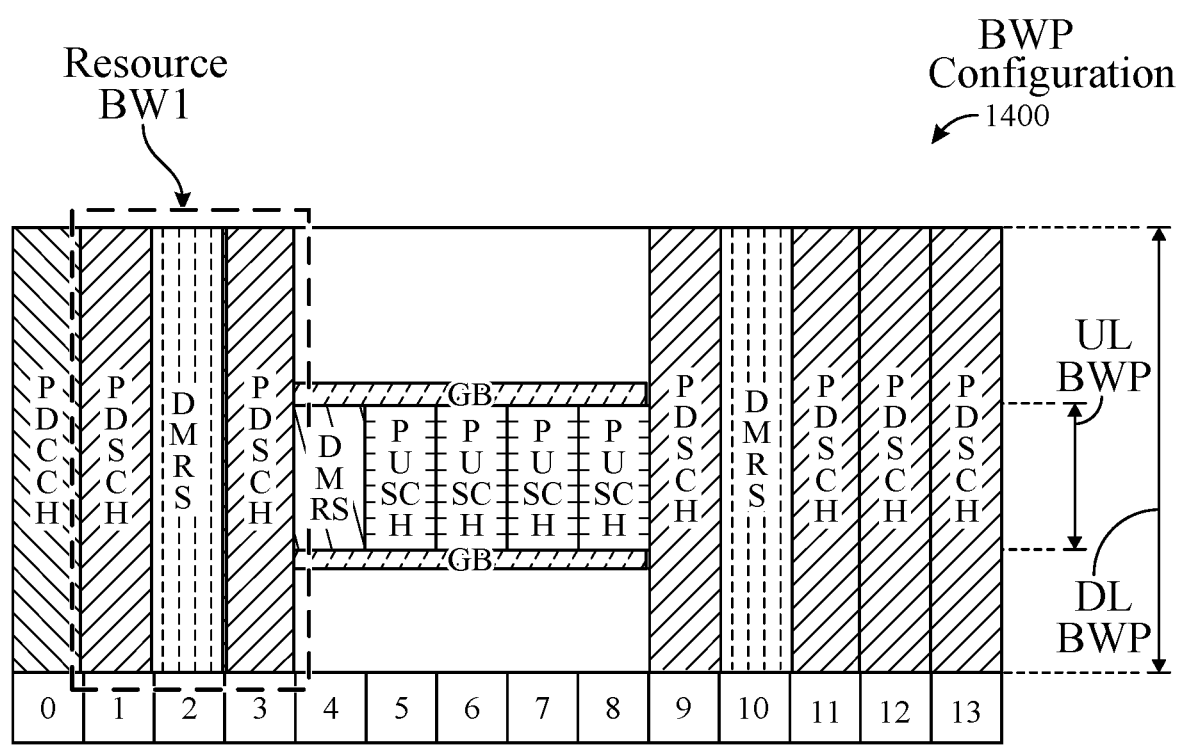

In some aspects, the symbols within an active BWP may be time division multiplexed (e.g., each symbol is either UL or DL) to allow for simultaneous UL/DL. FIG. 14, for example, illustrates an example BW configuration 1400 where the symbols 0-13 are time division multiplexed. That is, for each symbol 0-13, the symbol is either used for UL or DL.

Figure 15:
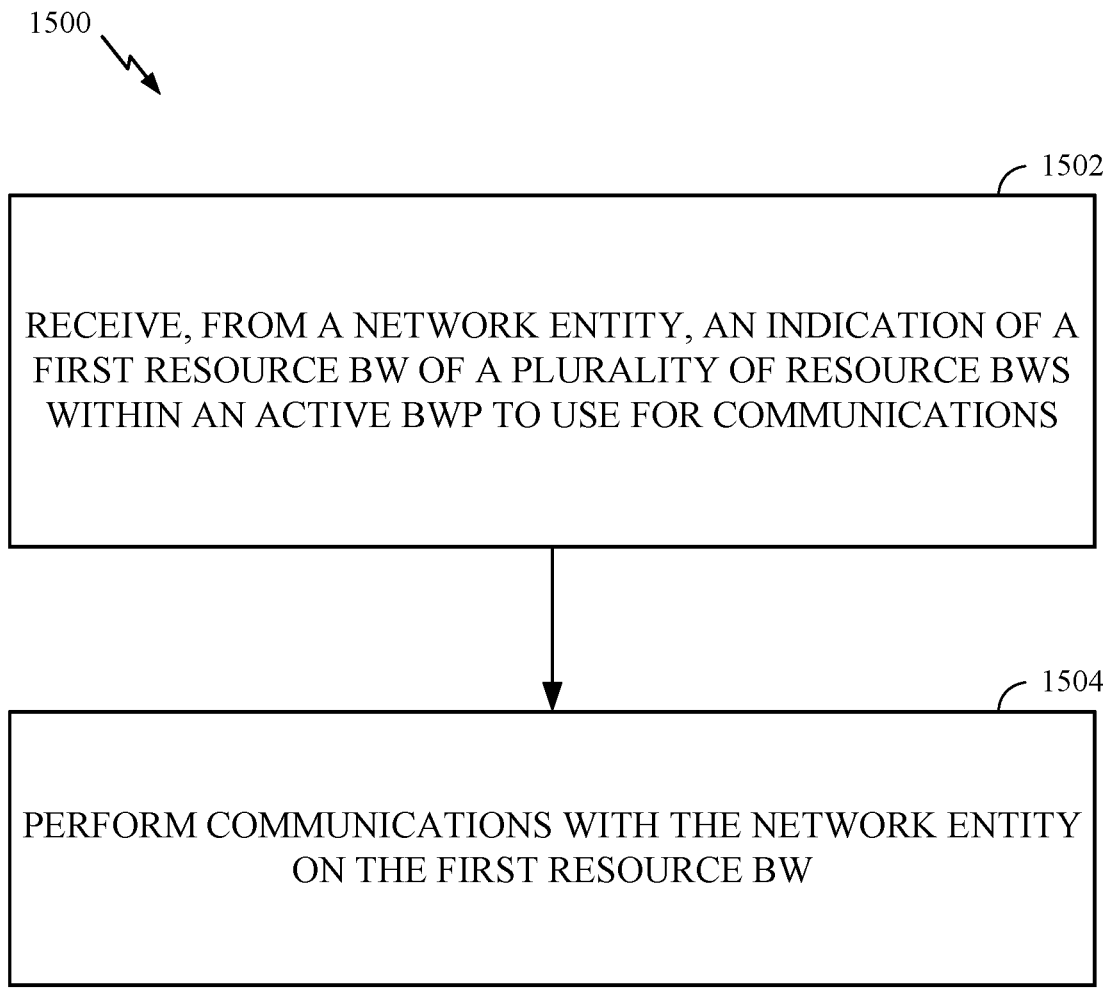
FIG. 15 is a flow diagram illustrating example operations for wireless communication by a user equipment (UE), in accordance with certain aspects of the present disclosure.

FIG. 15 is a flow diagram illustrating example operations 1500 for wireless communication, in accordance with certain aspects of the present disclosure. The operations 1500 may be performed, for example, by UE (e.g., such as a UE 120 in the wireless communication network 100, shown in FIG. 1). Operations 1500 may be implemented as software components that are executed and run on one or more processors (e.g., controller/processor 280 of FIG. 2). Further, the transmission and reception of signals by the UE in operations 1500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1500 may begin, at block 1502, where the UE receives, from a network entity (e.g., BS 110, such as a gNB), an indication of a first resource BW (e.g., resource BW 1004) of a plurality of resource BWs (e.g., resource BW 1004, resource BW 1006, resource BW 1008, and resource BW 1010) within an active BWP (e.g., active BWP 1002) to use for communications. In some aspects, each of the plurality of resource BWs may have a different configuration of frequency resources. At block 1504, the UE performs communications with the network entity on the first resource BW.

In certain aspects, the operations 1500 may further include switching from performing communications on the first resource BW (e.g., resource BW 1004) to performing communications on a second resource BW (e.g., resource BW 1006) of the plurality of resource BWs. The UE may switch to the second resource BW with reduced (e.g., near zero) latency, compared to the BWP switching delay depicted in FIGS. 8-9, for example. In some aspects, the switching time may be below a threshold that is set based on the cyclic prefix (CP) length (e.g., the switching time may be a fraction time of the CP length). In this manner, aspects enable the UE to adapt its operating BW without incurring a significant switching delay associated with conventional techniques.

In some aspects, the UE may receive (at 1502) the indication of the first resource BW via DCI signaling. In one aspect, the DCI signaling may indicate a slot of a plurality of slots (e.g., BWP configuration 1100A in FIG. 11A) to use as the first resource BW (e.g., resource BW 1104 in FIG. 11A). In another aspect, the DCI signaling may indicate a set of symbols (e.g., symbols 5-8 of BWP configuration 1100B in FIG. 11B) to use for the first resource BW (e.g., resource BW 1108 in FIG. 11B). In another aspect, the DCI signaling may indicate a start symbol (e.g., symbol 0 of the BWP configuration 1100B in FIG. 11B) of the first resource BW (e.g., resource BW 1110 in FIG. 11B) and a number of symbols (e.g., N=5) from the start symbol to use as the first resource BW.

In some aspects, the operations 1500 may further include receiving an indication of the plurality of resource BWs (e.g., resource BW 1004, resource BW 1006, resource BW 1008, and resource BW 1010) within the active BWP (e.g., active BWP 1002). In one aspect, the indication of the plurality of resource BWs within the active BWP may be received via RRC signaling. In some aspects, at least one of the plurality of resource BWs may include a disjoint set of frequency resources (e.g., resource BW 1008 in FIG. 10).

In some aspects, the plurality of resource BWs may include at least one of (i) one or more resource BWs configured for uplink communications or (ii) one or more resource BWs configured for downlink communications. In some examples, at least one of the resource BWs configured for uplink communications may be non-overlapping with respect to at least one of the resource BWs configured for downlink communications. In other examples, at least one of the resource BWs configured for uplink communications may at least partially overlap at least one of the resource BWs configured for downlink communications.

In some aspects, the operations 1500 may further include receiving, from the network entity, a configuration for performing simultaneous uplink and downlink operations in the first resource BW and a second resource BW of the plurality of resource BWs. In one aspect, the configuration may indicate that the resources of the first resource BW that collide with resources of the second resource BW are either rate matched or punctured. For example, the resources of the first BW may include a PDSCH that is rate matched and/or a DMRS that is punctured.

In one aspect, the configuration for performing simultaneous uplink and downlink operations may indicate that resources of the first resource BW are allocated to the UE and the resources of the second resource BW are allocated to another UE. In one aspect, the configuration for performing simultaneous uplink and downlink operations may indicate that resources of the first resource BW and the resources of the second resource BW are allocated to the same UE. In one aspect, the configuration for performing simultaneous uplink and downlink operations may indicate that resources of the first resource BW are time division multiplexed with the resources of the second resource BW.

Figure 16:
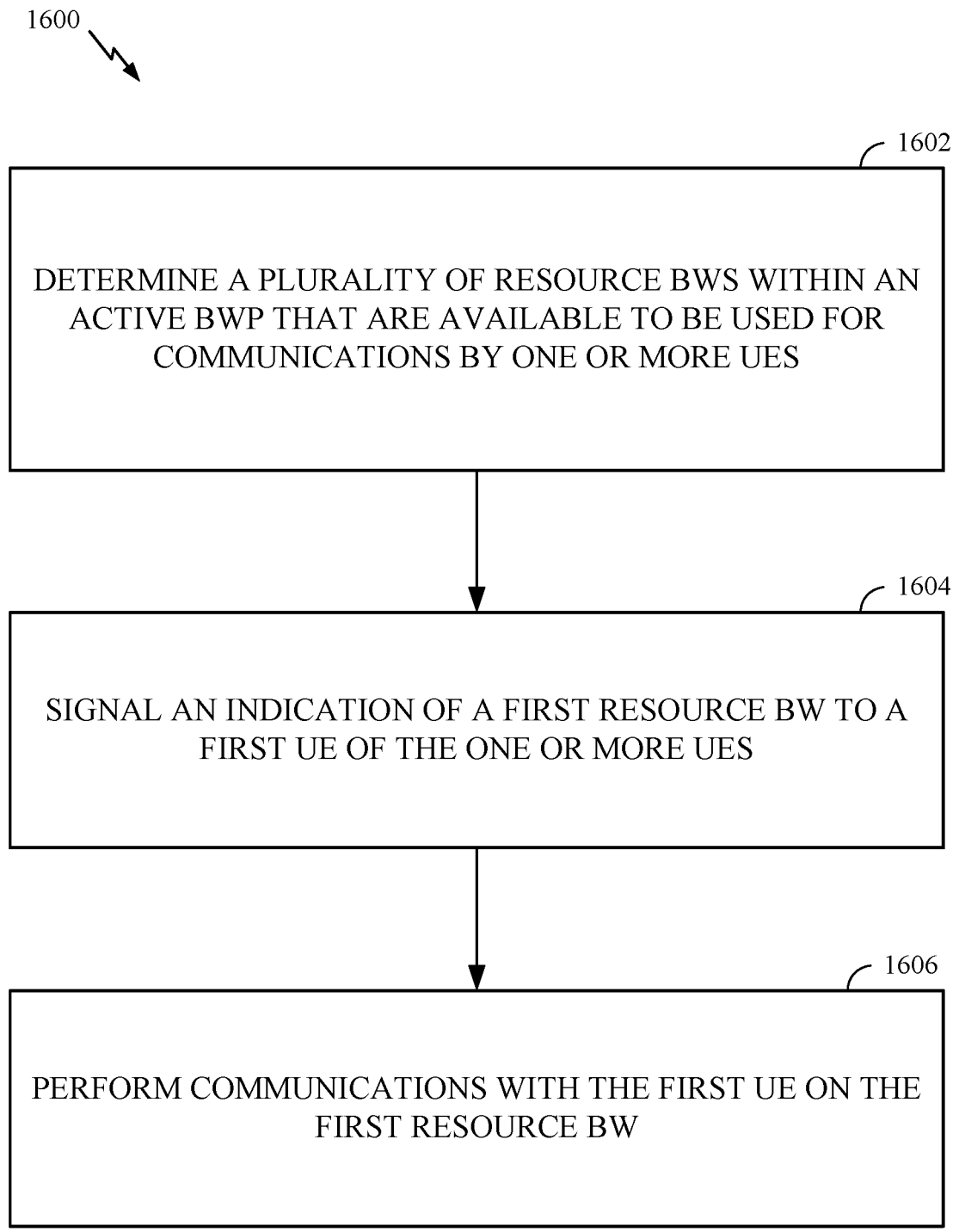
FIG. 16 is a flow diagram illustrating example operations for wireless communication by a base station (BS), in accordance with certain aspects of the present disclosure.

FIG. 16 is a flow diagram illustrating example operations 1600 for wireless communication, in accordance with certain aspects of the present disclosure. The operations 1600 may be performed, for example, by a BS (e.g., such as a BS 110 in the wireless communication network 100, shown in FIG. 1). Operations 1600 may be implemented as software components that are executed and run on one or more processors (e.g., controller/processor 240 of FIG. 2). Further, the transmission and reception of signals by the BS in operations 1600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1600 may begin, at block 1602, where the BS determines a plurality of resource BWs (e.g., resource BW 1004, resource BW 1006, resource BW 1008, and resource BW 1010) within an active BWP (e.g., active BWP 1002) that are available to be used for communications by one or more UEs. In some aspects, each of the plurality of resource BWs may have a different configuration of frequency resources. At block 1604, the BS signals an indication of a first resource BW (e.g., resource BW 1004) to a first UE of the one or more UEs. At block 1606, the BS performs communications with the first UE on the first resource BW.

In some aspects, the BS (at 1604) may signal the indication of the first resource BW via DCI signaling. In one aspect, the DCI signaling may indicate a slot of a plurality of slots (e.g., BWP configuration 1100A in FIG. 11A) to use as the first resource BW (e.g., resource BW 1104 in FIG. 11A). In another aspect, the DCI signaling may indicate a set of symbols (e.g., symbols 5-8 of BWP configuration 1100B in FIG. 11B) to use for the first resource BW (e.g., resource BW 1108 in FIG. 11B). In another aspect, the DCI signaling may indicate a start symbol (e.g., symbol 0 of the BWP configuration 1100B in FIG. 11B) of the first resource BW (e.g., resource BW 1110 in FIG. 11B) and a number of symbols (e.g., N=5) from the start symbol to use as the first resource BW.

In some aspects, the operations 1600 may further include signaling an indication of the plurality of resource BWs (e.g., resource BW 1004, resource BW 1006, resource BW 1008, and resource BW 1010) within the active BWP (e.g., active BWP 1002). In one aspect, the indication of the plurality of resource BWs within the active BWP may be signaled via RRC signaling. In some aspects, at least one of the plurality of resource BWs may include a disjoint set of frequency resources (e.g., resource BW 1008 in FIG. 10).

In some aspects, the plurality of resource BWs may include at least one of (i) one or more resource BWs configured for uplink communications or (ii) one or more resource BWs configured for downlink communications. In some examples, at least one of the resource BWs configured for uplink communications may be non-overlapping with respect to at least one of the resource BWs configured for downlink communications. In other examples, at least one of the resource BWs configured for uplink communications may at least partially overlap at least one of the resource BWs configured for downlink communications.

In some aspects, the operations 1600 may further include determining a configuration for performing simultaneous uplink and downlink operations in the first resource BW and a second resource BW of the plurality of resource BWs. The first resource BW may be configured for downlink and the second resource BW may be configured for uplink. The operations 1600 may further include signaling an indication of the configuration to the first UE.

In one aspect, the configuration may indicate that the resources of the first resource BW that collide with resources of the second resource BW are either rate matched or punctured. For example, the resources of the first resource BW may include a PDSCH that is rate matched and/or a DMRS that is punctured.

In one aspect, the configuration may indicate that resources of the first resource BW are allocated to the UE and the resources of the second resource BW are allocated to another UE. In one aspect, the configuration may indicate that resources of the first resource BW and the resources of the second resource BW are allocated to the same UE. In one aspect, the configuration may indicate that resources of the first resource BW are time division multiplexed with the resources of the second resource BW.

Figure 17:
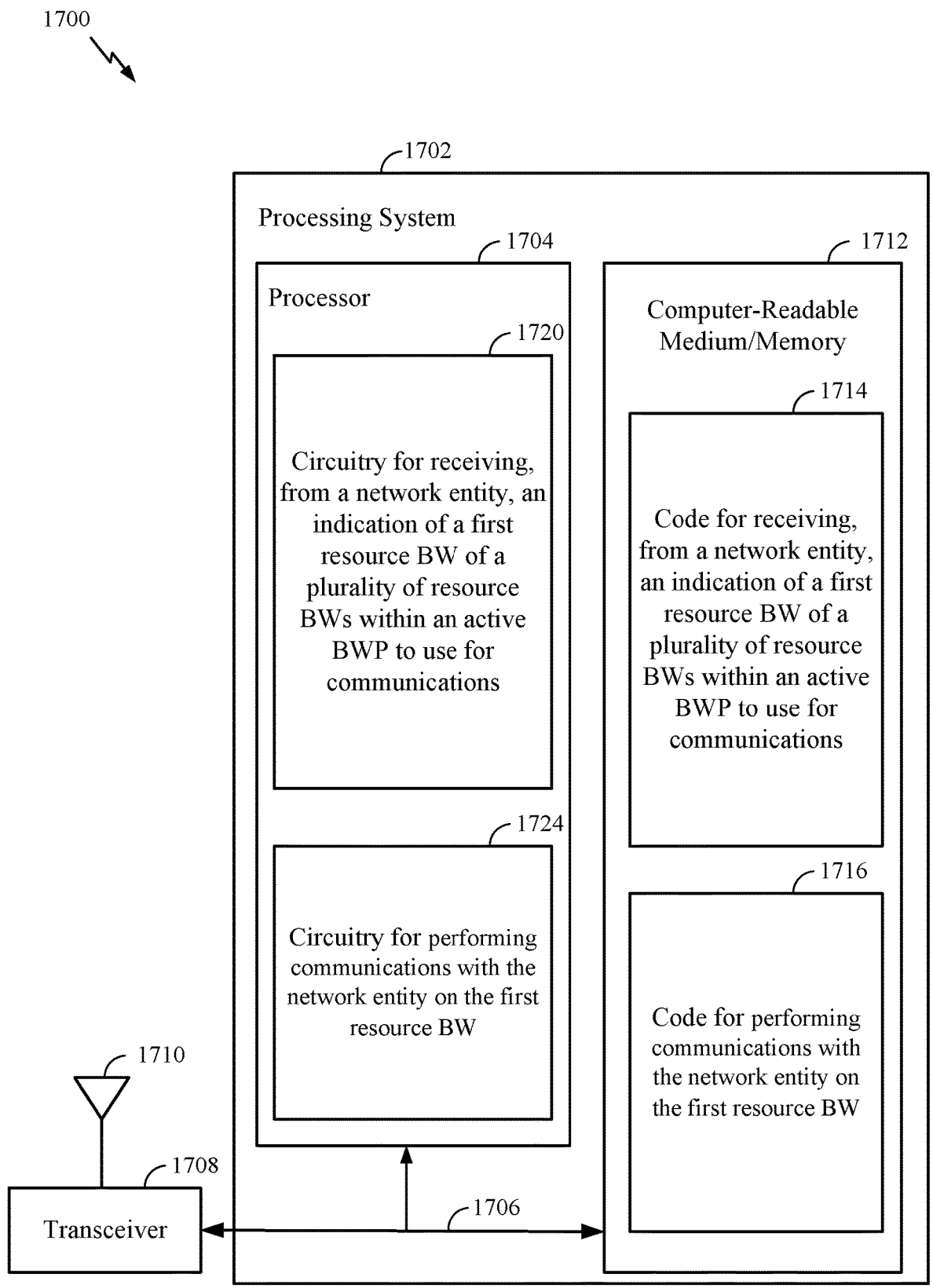
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 15. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 15, or other operations for performing the various techniques discussed herein. In certain aspects, computer-readable medium/memory 1712 stores code 1714 for receiving, from a network entity, an indication of a first resource BW of a plurality of resource BWs within an active BWP to use for communications and code 1716 for performing communications with the network entity on the first resource BW. In certain aspects, the processor 1704 has circuitry configured to implement the code stored in the computer-readable medium/memory 1712. The processor 1704 includes circuitry 1720 for receiving, from a network entity, an indication of a first resource BW of a plurality of resource BWs within an active BWP to use for communications and circuitry 1724 for performing communications with the network entity on the first resource BW.

Figure 18:
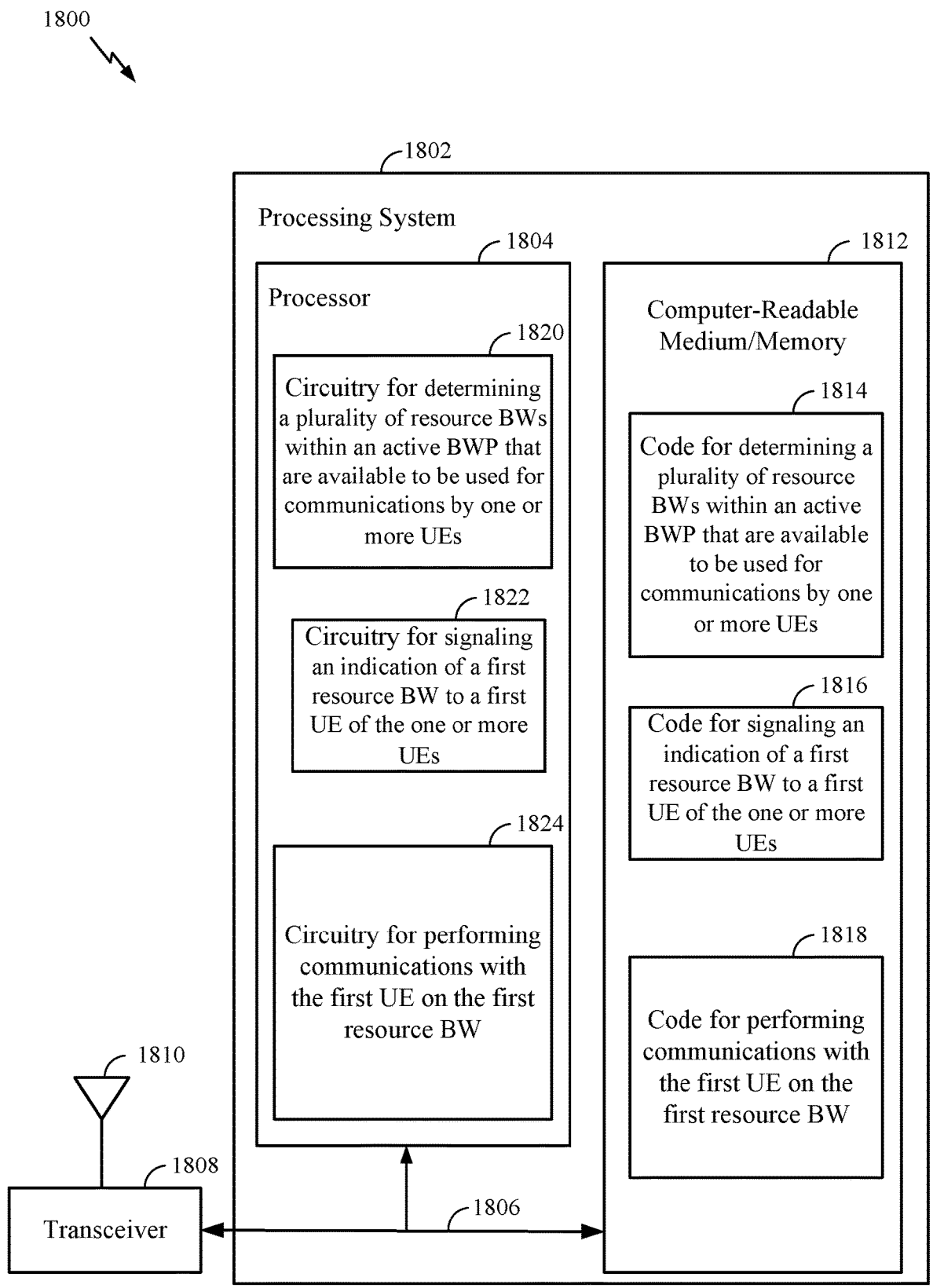
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 16. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 16, or other operations for performing the various techniques discussed herein. In certain aspects, computer-readable medium/memory 1812 stores code 1814 for determining a plurality of resource BWs within an active BWP that are available to be used for communications by one or more UEs, code 1816 for signaling an indication of a first resource BW to a first UE of the one or more UEs, and code 1818 for performing communications with the first UE on the first resource BW. In certain aspects, the processor 1804 has circuitry configured to implement the code stored in the computer-readable medium/memory 1812. The processor 1804 includes circuitry 1820 for determining a plurality of resource BWs within an active BWP that are available to be used for communications by one or more UEs, circuitry 1822 for signaling an indication of a first resource BW to a first UE of the one or more UEs, and circuitry 1824 for performing communications with the first UE on the first resource BW.

EXAMPLE ASPECTS

Implementation examples are described in the following numbered clauses:

1. A method for wireless communication by a UE, comprising: receiving, from a network entity, an indication of a first resource BW of a plurality of resource BWs within an active BWP to use for communications; and performing communications with the network entity on the first resource BW.
2. The method of Aspect 1, further comprising switching from performing communications on the first resource BW to performing communications on a second resource BW of the plurality of resource BWs.
3. The method of any of Aspects 1-2, wherein an amount of time associated with switching from performing communications on the first resource BW to performing communications on the second resource BW is below a threshold that is set based on a cyclic prefix length.

4. The method of any of Aspects 1-3, wherein the indication of the first resource BW is received via DCI signaling.

5. The method of Aspect 4, wherein the DCI signaling indicates a slot of a plurality of slots to use as the first resource BW.

6. The method of Aspect 4, wherein the DCI signaling indicates a set of symbols to use for the first resource BW.

7. The method of Aspect 4, wherein the DCI signaling indicates a start symbol of the first resource BW and a number of symbols from the start symbol to use as the first resource BW.

8. The method of any of Aspects 1-7, further comprising receiving an indication of the plurality of resource BWs within the active BWP.

9. The method of Aspect 8, wherein the indication of the plurality of resource BWs within the active BWP is received via RRC signaling.

10. The method of any of Aspects 1-9, wherein at least one of the plurality of resource BWs comprises a disjoint set of frequency resources.

11. The method of any of Aspects 1-10, wherein the plurality of resource BWs comprise at least one of (i) one or more resource BWs configured for uplink communications or (ii) one or more resource BWs configured for downlink communications.

12. The method of Aspect 11, wherein at least one of the resource BWs configured for uplink communications is non-overlapping with respect to at least one of the resource BWs configured for downlink communications.

13. The method of Aspect 11, wherein at least one of the resource BWs configured for uplink communications at least partially overlaps at least one of the resource BWs configured for downlink communications.

14. The method of Aspect 11, wherein (i) at least one of the resource BWs configured for uplink communications fully overlaps at least one of the resource BWs configured for downlink communications or (ii) at least one of the resource BWs configured for downlink communications fully overlaps at least one of the resource BWs configured for uplink communications.

15. The method of any of Aspects 1-14, wherein each of the plurality of resource BWs has a different configuration of frequency resources.

16. The method of any of Aspects 1-15, further comprising receiving, from the network entity, a configuration for performing simultaneous uplink and downlink operations in the first resource BW and a second resource BW of the plurality of resource BWs, wherein the first resource BW is configured for downlink and the second resource BW is configured for uplink.

17. The method of Aspect 16, wherein the configuration indicates that resources of the first resource BW that collide with resources of the second resource BW are either rate matched or punctured.

18. The method of Aspect 17, wherein the resources of the first resource BW comprises at least one of a physical downlink shared channel and a demodulation reference signal.

19. The method of Aspect 18, wherein the physical downlink shared channel is rate matched and the demodulation reference signal is punctured.

20. The method of any of Aspects 17-19, wherein the resources of the first resource BW are allocated to the UE and the resources of the second resource BW are allocated to another UE.

21. The method of any of Aspects 17-19, wherein the resources of the first resource BW and the resources of the second resource BW are allocated to the UE.

22. The method of Aspect 16, wherein the configuration indicates that resources of the first resource BW are time division multiplexed with the resources of the second resource BW.

23. A method for wireless communication by a network entity, comprising: determining a plurality of resource BWs within an active BWP that are available to be used for communications by one or more UEs; signaling an indication of a first resource BW to a first UE of the one or more UEs; and performing communications with the first UE on the first resource BW.

24. The method of Aspect 23, wherein the indication of the first resource BW is signaled via DCI signaling.

25. The method of Aspect 24, wherein the DCI signaling indicates a slot of a plurality of slots to use as the first resource BW.

26. The method of Aspect 24, wherein the DCI signaling indicates a set of symbols to use as the first resource BW.

27. The method of Aspect 24, wherein the DCI signaling indicates a start symbol of the first resource BW and a number of symbols from the start symbol to use as the first resource BW.

28. The method of any of Aspects 23-27, further comprising signaling an indication of the plurality of resource BWs within the active BWP.

29. The method of Aspect 28, wherein the indication of the plurality of resource BWs within the active BWP is signaled via RRC signaling.

30. The method of any of Aspects 23-29, wherein at least one of the plurality of resource BWs comprises a disjoint set of frequency resources.

31. The method of any of Aspects 23-30, wherein the plurality of resource BWs comprise at least one of (i) one or more resource BWs configured for uplink communications or (ii) one or more resource BWs configured for downlink communications.

32. The method of Aspect 31, wherein at least one of the resource BWs configured for uplink communications is non-overlapping with respect to at least one of the resource BWs configured for downlink communications.

33. The method of Aspect 31, wherein at least one of the resource BWs configured for uplink communications partially overlaps at least one of the resource BWs configured for downlink communications.

34. The method of Aspect 31, wherein (i) at least one of the resource BWs configured for uplink communications fully overlaps at least one of the resource BWs configured for downlink communications or (ii) at least one of the resource BWs configured for downlink communications fully overlaps at least one of the resource BWs configured for uplink communications.

35. The method of any of Aspects 23-34, wherein each of the plurality of resource BWs has a different configuration of frequency resources.

36. The method of any of Aspects 23-35, further comprising: determining a configuration for performing simultaneous uplink and downlink operations in the first resource BW and a second resource BW of the plurality of resource BWs, wherein the first resource BW is configured for downlink and the second resource BW is configured for uplink; and signaling an indication of the configuration to the first UE.

37. The method of Aspect 36, wherein the configuration indicates that resources of the first resource BW that collide with resources of the second resource BW are either rate matched or punctured.

38. The method of Aspect 37, wherein the resources of the first BW comprises at least one of a physical downlink shared channel and a demodulation reference signal.

39. The method of Aspect 38, wherein the physical downlink shared channel is rate matched and the demodulation reference signal is punctured.

40. The method of any of Aspects 37-39, wherein the resources of the first BW are allocated to the first UE and the resources of the second BW are allocated to a second UE of the one or more UEs.

41. The method of any of Aspects 37-39, wherein the resources of the first BW and the resources of the second BW are allocated to the first UE.

42. The method of Aspect 36, wherein the configuration indicates that resources of the first resource BW are time division multiplexed with the resources of the second resource BW.

43. An apparatus comprising at least one processor and a memory coupled to the at least one processor, the at least one processor being configured to perform any of the methods of Aspects 1-22.

44. An apparatus comprising at least one processor and a memory coupled to the at least one processor, the at least one processor being configured to perform any of the methods of Aspects 23-42.

45. An apparatus comprising means for performing any of the methods of Aspects 1-22.

46. An apparatus comprising means for performing any of the methods of Aspects 23-42.

47. A computer-readable storage medium having computer executable code stored thereon, which when executed by one or more processors, perform any of the methods of Aspects 1-22.

48. A computer-readable storage medium having computer executable code stored thereon, which when executed by one or more processors, perform any of the methods of Aspects 23-42.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 15-16.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
receiving, from a network entity, an indication of a first resource bandwidth (BW) of a plurality of resource BWs within an active bandwidth part (BWP) to use for communications;
performing communications with the network entity on the first resource BW; and
switching from performing communications on the first resource BW to performing communications on a second resource BW of the plurality of resource BWs, wherein an amount of time associated with switching from performing communications on the first resource BW to performing communications on the second resource BW is below a threshold that is set based on a cyclic prefix length.

2. The method of claim 1, wherein the indication of the first resource BW is received via downlink control information (DCI) signaling.

3. The method of claim 2, wherein:
the DCI signaling indicates a slot of a plurality of slots to use as the first resource BW; or
the DCI signaling indicates a set of symbols to use for the first resource BW.

4. The method of claim 2, wherein the DCI signaling indicates a start symbol of the first resource BW and a number of symbols from the start symbol to use as the first resource BW.

5. The method of claim 1, further comprising receiving an indication of the plurality of resource BWs within the active BWP via radio resource control (RRC) signaling.

6. The method of claim 1, wherein the plurality of resource BWs comprise at least one of (i) one or more resource BWs configured for uplink communications or (ii) one or more resource BWs configured for downlink communications.

7. The method of claim 6, wherein at least one of the resource BWs configured for uplink communications is non-overlapping with respect to at least one of the resource BWs configured for downlink communications.

8. The method of claim 6, wherein at least one of the resource BWs configured for uplink communications at least partially overlaps at least one of the resource BWs configured for downlink communications.

9. The method of claim 1, wherein each of the plurality of resource BWs has a different configuration of frequency resources.

10. The method of claim 1, further comprising receiving, from the network entity, a configuration for performing simultaneous uplink and downlink operations in the first resource BW and the second resource BW of the plurality of resource BWs, wherein the first resource BW is configured for downlink and the second resource BW is configured for uplink.

11. A method for wireless communication by a user equipment (UE), comprising:
receiving, from a network entity, (i) an indication of a first resource bandwidth (BW) of a plurality of resource BWs within an active bandwidth part (BWP) to use for communications and (ii) a configuration for performing simultaneous uplink and downlink operations in the first resource BW and a second resource BW of the plurality of resource BWs, wherein the first resource BW is configured for downlink and the second resource BW is configured for uplink and wherein the configuration indicates that resources of the first resource BW that collide with resources of the second resource BW are either rate matched or punctured; and
performing communications with the network entity on at least one of the first resource BW or the second resource BW based on the configuration.

12. The method of claim 11, wherein:
the resources of the first resource BW are allocated to the UE and the resources of the second resource BW are allocated to another UE; or
the resources of the first resource BW and the resources of the second resource BW are allocated to the UE.

13. The method of claim 10, wherein the configuration indicates that resources of the first resource BW are time division multiplexed with the resources of the second resource BW.

14. An apparatus for wireless communication, comprising:
one or more memories collectively storing instructions; and
one or more processors coupled to the one or more memories, the one or more processors being collectively configured to execute the instructions to cause the apparatus to perform an operation comprising:
receiving, from a network entity, an indication of a first resource bandwidth (BW) of a plurality of resource BWs within an active bandwidth part (BWP) to use for communications;
performing communications with the network entity on the first resource BW; and
switching from performing communications on the first resource BW to performing communications on a second resource BW of the plurality of resource BWs, wherein an amount of time associated with switching from performing communications on the first resource BW to performing communications on the second resource BW is below a threshold that is set based on a cyclic prefix length.

15. A method for wireless communication by a network entity, comprising:
determining a plurality of resource bandwidths (BWs) within an active BWP that are available to be used for communications by one or more user equipments (UEs);
determining a configuration for performing simultaneous uplink and downlink operations in a first resource BW and a second resource BW of the plurality of resource BWs;
signaling an indication of the first resource BW and the configuration to a first UE of the one or more UEs, wherein the configuration indicates that resources of the first resource BW that collide with resources of the second resource BW are either rate matched or punctured; and
performing communications with the first UE on the first resource BW.

16. The method of claim 15, wherein the indication of the first resource BW is signaled via downlink control information (DCI) signaling.

17. The method of claim 16, wherein:
the DCI signaling indicates a slot of a plurality of slots to use as the first resource BW; or
the DCI signaling indicates a set of symbols to use as the first resource BW.

18. The method of claim 16, wherein the DCI signaling indicates a start symbol of the first resource BW and a number of symbols from the start symbol to use as the first resource BW.

19. The method of claim 15, further comprising signaling an indication of the plurality of resource BWs within the active BWP via radio resource control (RRC) signaling.

20. The method of claim 15, wherein the plurality of resource BWs comprise at least one of (i) one or more resource BWs configured for uplink communications or (ii) one or more resource BWs configured for downlink communications.

21. The method of claim 20, wherein at least one of the resource BWs configured for uplink communications is non-overlapping with respect to at least one of the resource BWs configured for downlink communications.

22. The method of claim 20, wherein at least one of the resource BWs configured for uplink communications partially overlaps at least one of the resource BWs configured for downlink communications.

23. The method of claim 15, wherein each of the plurality of resource BWs has a different configuration of frequency resources.

24. The method of claim 15, wherein the first resource BW is configured for downlink and the second resource BW is configured for uplink.

25. The method of claim 15, wherein:
the resources of the first resource BW are allocated to the first UE and the resources of the second resource BW are allocated to a second UE of the one or more UEs; or
the resources of the first resource BW and the resources of the second resource BW are allocated to the first UE.

26. The method of claim 24, wherein the configuration indicates that resources of the first resource BW are time division multiplexed with the resources of the second resource BW.

27. An apparatus for wireless communication, comprising:
one or more memories collectively storing instructions; and
one or more processors coupled to the one or more memories, the one or more processors being collectively configured to execute the instructions to cause the apparatus to perform an operation comprising:
determining a plurality of resource bandwidths (BWs) within an active BWP that are available to be used for communications by one or more user equipments (UEs);
determining a configuration for performing simultaneous uplink and downlink operations in a first resource BW and a second resource BW of the plurality of resource BWs;
transmitting an indication of the first resource BW to a first UE of the one or more UEs, wherein the configuration indicates that resources of the first resource BW that collide with resources of the second resource BW are either rate matched or punctured; and
performing communications with the first UE on the first resource BW.

28. The apparatus of claim 14, wherein the plurality of resource BWs comprise at least one of (i) one or more resource BWs configured for uplink communications or (ii) one or more resource BWs configured for downlink communications.

29. The apparatus of claim 28, wherein at least one of the resource BWs configured for uplink communications is non-overlapping with respect to at least one of the resource BWs configured for downlink communications.

30. The apparatus of claim 28, wherein at least one of the resource BWs configured for uplink communications at least partially overlaps at least one of the resource BWs configured for downlink communications.

31. An apparatus for wireless communication, comprising:
one or more memories collectively storing instructions; and
one or more processors coupled to the one or more memories, the one or more processors being collectively configured to execute the instructions to cause the apparatus to perform an operation comprising:
receiving, from a network entity, (i) an indication of a first resource bandwidth (BW) of a plurality of resource BWs within an active bandwidth part (BWP) to use for communications and (ii) a configuration for performing simultaneous uplink and downlink operations in the first resource BW and a second resource BW of the plurality of resource BWs, wherein the first resource BW is configured for downlink and the second resource BW is configured for uplink and wherein the configuration indicates that resources of the first resource BW that collide with resources of the second resource BW are either rate matched or punctured; and
performing communications with the network entity on at least one of the first resource BW or the second resource BW based on the configuration.

* * * * *